(12) United States Patent
Van De Van et al.

(10) Patent No.: US 7,676,407 B2
(45) Date of Patent: Mar. 9, 2010

(54) METHOD AND APPARATUS FOR ACCOUNT PAYABLE MATCHING FOR AN ONLINE PURCHASING SYSTEM

(75) Inventors: David J Van De Van, Waukesha, WI (US); Prashant Sinha, Brookfield, WI (US); Moshin Dawoodbhai, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 926 days.

(21) Appl. No.: 10/832,181

(22) Filed: Apr. 26, 2004

(65) Prior Publication Data

US 2005/0240524 A1  Oct. 27, 2005

(51) Int. Cl.
 *G06Q 40/00* (2006.01)
(52) U.S. Cl. .............................. 705/35; 705/1; 705/30; 705/80
(58) Field of Classification Search .................. 705/35, 705/1, 30, 80
See application file for complete search history.

(56) References Cited

U.S. PATENT DOCUMENTS

| 4,951,196 | A | * | 8/1990 | Jackson | 705/37 |
|---|---|---|---|---|---|
| 5,202,977 | A | * | 4/1993 | Pasetes et al. | 703/27 |
| 5,410,675 | A | * | 4/1995 | Shreve et al. | 710/65 |
| 5,557,780 | A | * | 9/1996 | Edwards et al. | 703/27 |
| 5,758,126 | A | * | 5/1998 | Daniels et al. | 715/780 |
| 5,794,206 | A | * | 8/1998 | Wilkinson et al. | 705/1 |
| 5,794,234 | A | * | 8/1998 | Church et al. | 707/4 |
| 5,878,419 | A | * | 3/1999 | Carter | 707/10 |
| 2002/0038305 | A1 | * | 3/2002 | Bahl et al. | 707/100 |

* cited by examiner

*Primary Examiner*—James P Trammell
*Assistant Examiner*—Shahid R Merchant
(74) *Attorney, Agent, or Firm*—Peter Vogel, Esq.; Ellis B. Ramirez, Esq.; Michael G. Smith, Esq.

(57) ABSTRACT

Systems and methods are provided for an online purchasing system. In one embodiment, the online system includes business logic for approving a purchase requisition having a plurality of itemized goods and service and requiring approval by a plurality of authorized approvers on a line item by line item basis. An approval table defining identified authorized approver and conditions under which the authorized approvers must approve specified line items in a particular purchase request is generated by the online purchasing system to enable approvers of the purchase requisition to monitor the status of the particular purchase request. In a second embodiment, the online purchasing system through extracting business logic identified a second group of authorized approver and conditions under which the authorized approvers must approve specified line items.

43 Claims, 11 Drawing Sheets

METHOD AND APPARATUS FOR ACCOUNT PAYABLE MATCHING FOR AN ONLINE PURCHASING SYSTEM

RELATED APPLICATION

This application is related to copending U.S. application Ser. No. 10/832,046, filed Apr. 26, 2004 entitled "Methods and apparatus for online purchasing of outsourced services and products."

FIELD OF THE INVENTION

This invention relates generally to a procurement system, and more particularly to a method and apparatus for integrating procurement with account payables.

BACKGROUND OF THE INVENTION

Large business and organizations often conduct business across various geography regions, products, and enterprises. It is common that a business is divided into one or more business units, products, or departments that are most often handled independently of one another with regard to reporting and accounting. This division has led to development of different systems and methodologies for carrying out the procurement process (buying) and for the accounting for procurement of items or services (paying). Further, when these organizations are merged or consolidated, the number of disparate systems tends to increase, thus requiring high maintenance and overhead costs. In many organizations procurement is still a fragmented, paper-intensive process that involves many forms and many hours of communications between outside and internal parties to achieve the approval cycle. The internal communications requires interaction with different areas of the organization such as accounting, management, lines of business, receiving, and others each having their own process and approval flows.

For any organization the procurement of goods and services is a core business function that is necessary to carry out the operations of the organization. The organizations buy direct goods such as raw materials or components. The organizations also buy goods or services such as travel, consulting, equipment, office supplies that while not directly connected to operations are necessary for the function of the organization.

In the procurement process, to document purchases and establish the rights and obligations of the parties as to the exact nature of the items desired and their respective quantities, prices, and other stipulations, a purchase order ("PO") is created by the buyer and is sent to the Seller either electronically or on paper. The seller fills the order in accordance with the requirements of the PO and delivers the item to the buyer's designated location. Once received by the buyer an invoice reflecting the amount of monies due and payable in exchange for the items provided. The accounts payable ("A/P") department of the buyer compares the invoice to the original PO to ensure the purchase was properly authorized and to confirm that the terms on the invoice are consistent with those documented in the PO. Additionally, the invoice is parsed to extract the associated transportation or shipping charges, and any applicable sales taxes into its appropriate expense category for profit and loss ("P/L") posting. This process exists in some form in virtually all businesses. In large businesses, it is automated significantly through specialized software or an integrated Enterprise Resource Planning ("ERP") system.

When the item that is ordered through the PO system, the item received, and the invoice, are all in agreement this is known as a "three-way match."

Organizations have different systems and methodologies for handling each element of the three-way match. Some organizations may use a manual system such as paper to order, invoice, or account for receipt of purchases. The manual system is inherently slow and expensive since it requires mailings, manual extraction, and data entry. Other organizations use exclusively automated systems like ERP, Electronic Data Interchange ("EDI"), and Electronic Invoice Presentment and Payment ("EIPP") for the purchasing, invoicing, and managing of payables. One major obstacle for using these systems is that there is a lack of uniformity as to data format for the electronic files. When incompatibility is encountered organizations will either resort to a manual system for part of the overall process or invest information technology resources into providing a fix. This disparity of compatibility in an organization is an obstacle to data sharing, uniform policies and processes, and integration of procurement system through new acquisitions.

For the reasons stated above, and for other reasons stated below which will become apparent to those skilled in the art upon reading and understanding the present specification, there is a need in the art for an acceleration of the purchasing process, identification of existing inventory to reduce redundant purchasing, detection of unauthorized purchases, determination of purchasing patterns for budgeting and patterns of behavior, and ensuring contract compliance. There is also a need for an improved and quick resolution of line item approval and flagging of exceptional requests.

SUMMARY OF THE INVENTION

The above-mentioned shortcomings, disadvantages and problems are addressed herein, which will be understood by reading and studying the following specification.

Various aspects of the embodiments discussed below provide communicating data from an online procurement system to an account payable system by extracting procurement data having a first format from an online procurement system, splitting the extracted procurement data to a predefined format, and communicating the created procurement data in the account payable format to an account payable system.

Another embodiment discussed below provide communicating data from an online procurement system to an account payable system by extracting procurement data having a first format from an online procurement system, splitting the extracted procurement data to a predefined format and a header file, line item file, shipment file, and distribution file.

Yet another embodiment is splitting the record numbers to a unique code that is indicative of a targeted account payable system. A computer-accessible medium is provided for communicating data from an online procurement system to an account payable system by extracting procurement data having a first format from an online procurement system, splitting the extracted procurement data to a predefined format, and communicating the created procurement data in the account payable format to an account payable system.

Another aspect of the embodiment is to a system for transacting electronic commerce by using a processor, a storage device coupled to the processor, and a software programmed device for performing verification of purchase orders by verifying from a first file, a second file, and a third file the degree of purchase order fulfillment by a supplier.

Yet another embodiment is splitting the record numbers to a unique code that is indicative of a targeted account payable system. A computer-accessible medium is provided for communicating data from an online procurement system to an account payable system by extracting procurement data having a first format from an online procurement system, splitting the extracted procurement data to a predefined format, and communicating the created procurement data in the account payable format to an account payable system. Further the splitting comprises loading CTL files of at least one of header file, line item file, shipment file, and distribution file, mapping procurement data fields to account payable data fields, assigning default values to account payable data fields that are not populated in extracted procurement data fields.

Systems, clients, servers, methods, and computer-readable media of varying scope are described herein. In addition to the aspects and advantages described in this summary, further aspects and advantages will become apparent by reference to the drawings and by reading the detailed description that follows.

DETAILED DESCRIPTION OF THE INVENTION

In the following detailed description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
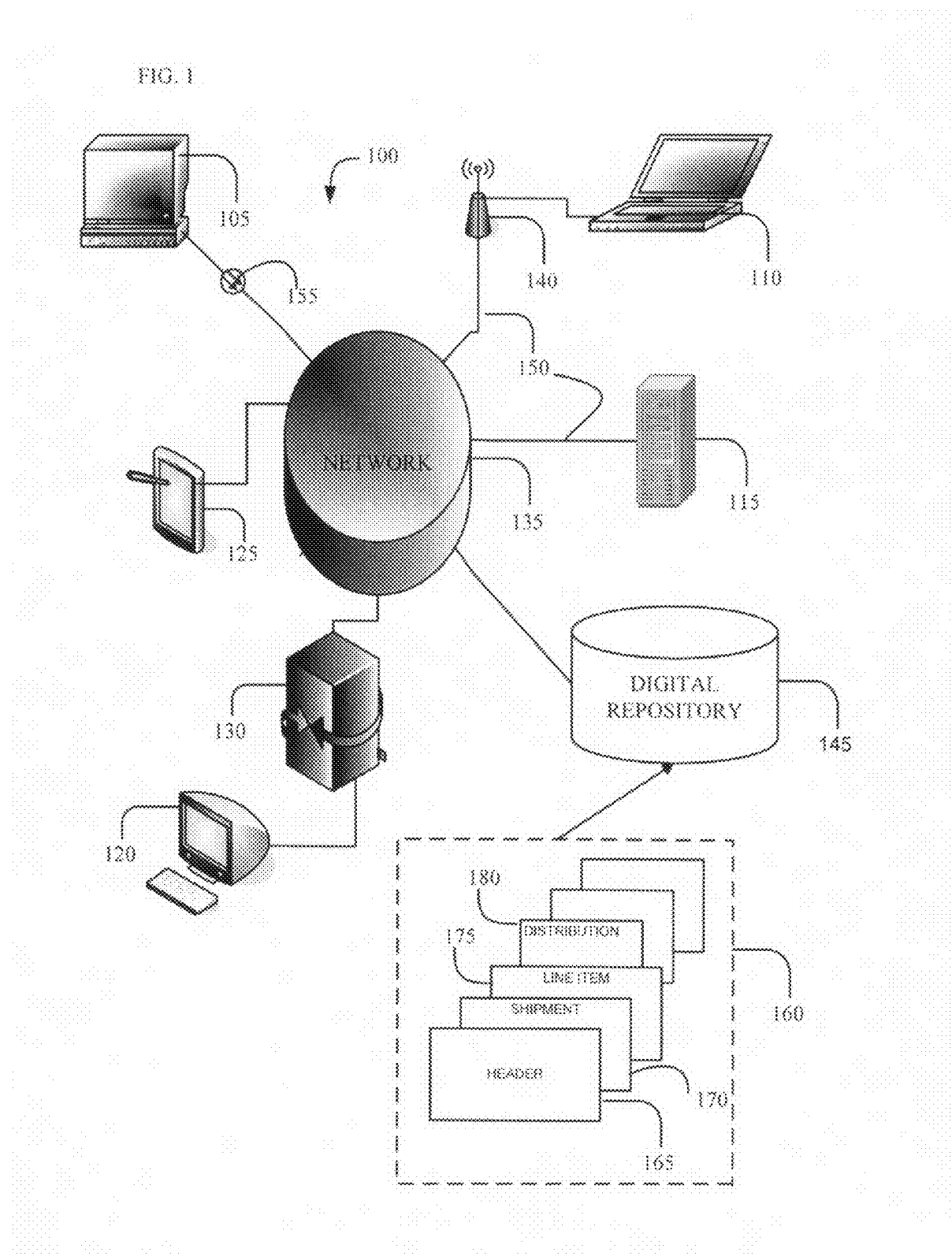
FIG. 1 is a diagram illustrating a system-level overview of an online purchasing embodiment.

FIG. 1 depicts a network arrangement 100 for inputting, accessing, and interacting with purchasing information. A user accesses the computer system or server 125 through a terminal 105, 110, 120 or 125. The user can be a supplier of an item or an intangible, a buyer of the item or intangible, and an administrator that facilitates an exchange between the supplier and the buyer. The server 125 provides a user with a sign-on facility to the online purchasing of items or services as well as the ability for certain users to change or customize the procurement system. In the preferred embodiment of the system 100, a user at terminal 105 can access the network 135 or the internet through gateway 130 to connect to the server 125. In other embodiments, the server 125 can reside on an intranet, an extranet, a local area network ("LAN"), a wide area network ("WAN"), or any other type of network or stand-alone computer. If the server 125 resides on a network, then the computer or terminal at 105 is any machine or device capable of connecting to that network. If the server 125 can be accessed by the Internet, then the computer or terminal at 105 is any machine or device capable of connecting to the Internet. If the computer system at 105 is a stand-alone computer, then the server at 125 is the same device as the computer at 105. The user can be linked to the server 125 by fiber optic cable 155, wireless system 140, by a gateway 130, by a network 135, or a combination of these linking devices.

The procurement order management and receipt system 100 is a comprehensive tool for managing the transactions and accounting entries relating to purchase orders in an enterprise. The computer system 125 is able to receive, incorporate, store, and process information that is important to the managing of purchasing orders. Accounting entries relating to those orders and receipts 160 can be automatically generated by the server 125 and stored showing organizational, product, vendor, or other relationships. The server 125 can distinguish between different profit centers, departments, offices, geographies, subsidiaries, and other subgroups with each defined subgroup constituting an account owner of a purchasing order. The user or administrator of the system defines each subgroup with accounting requirements as an accounting owner for receiving account payable information and line items. In this example, source digital repository 145 stores various documents that are available for retrieval. This repository can be a digital library, a database, a website, or any other information repository. The digital repository 145 is coupled to the online purchasing system 100 to provide ordering and catalog information to the user. Digital repository 145 may be an "off-the-shelf" software product such as an Oracle database software developed and sold by Oracle Corporation of Redwood City, Calif. In the online system, data is stored in digital repository 145 in the form of data objects with associating data attributes. The term document can be forms, forms with data such video clips, audio clips, or links to multimedia streams.

Item 160 is a representation of a procurement document in the digital repository 145 for the procurement order management and receipt system 100. The header 165, shipment 170, line item 175, and distribution 180 are the main components of a purchase order. The header 165 and line item 175 are the components of a receiver or receipt order. The header 165 encapsulates information concerning the parties such as buyer, seller, organization, and department, individual in the approval process. The header also encapsulates information concerning the delivery options for the item and services render by the seller. See table 2 "receipt order header fields" for additional information. The shipment 170 encapsulates information about the ship to location, the type of shipment, the carriers, and other information that conveys logistic data. See table 1 for additional information. The line item 175 encapsulates information concerning quantity, price, reduction in price, handling, currency of payment, and point of delivery, and other information that conveys the intention of the parties concerning the product or the services. See table 3 "receipt line item fields" for additional information. The distribution 180 encapsulates information concerning the location of delivery or performance of the services, the approvers, the place to deliver the item or service, and other information that conveys how the purchase order is to be distributed. See table 1 "purchase order fields" for additional information.

Figure 2:
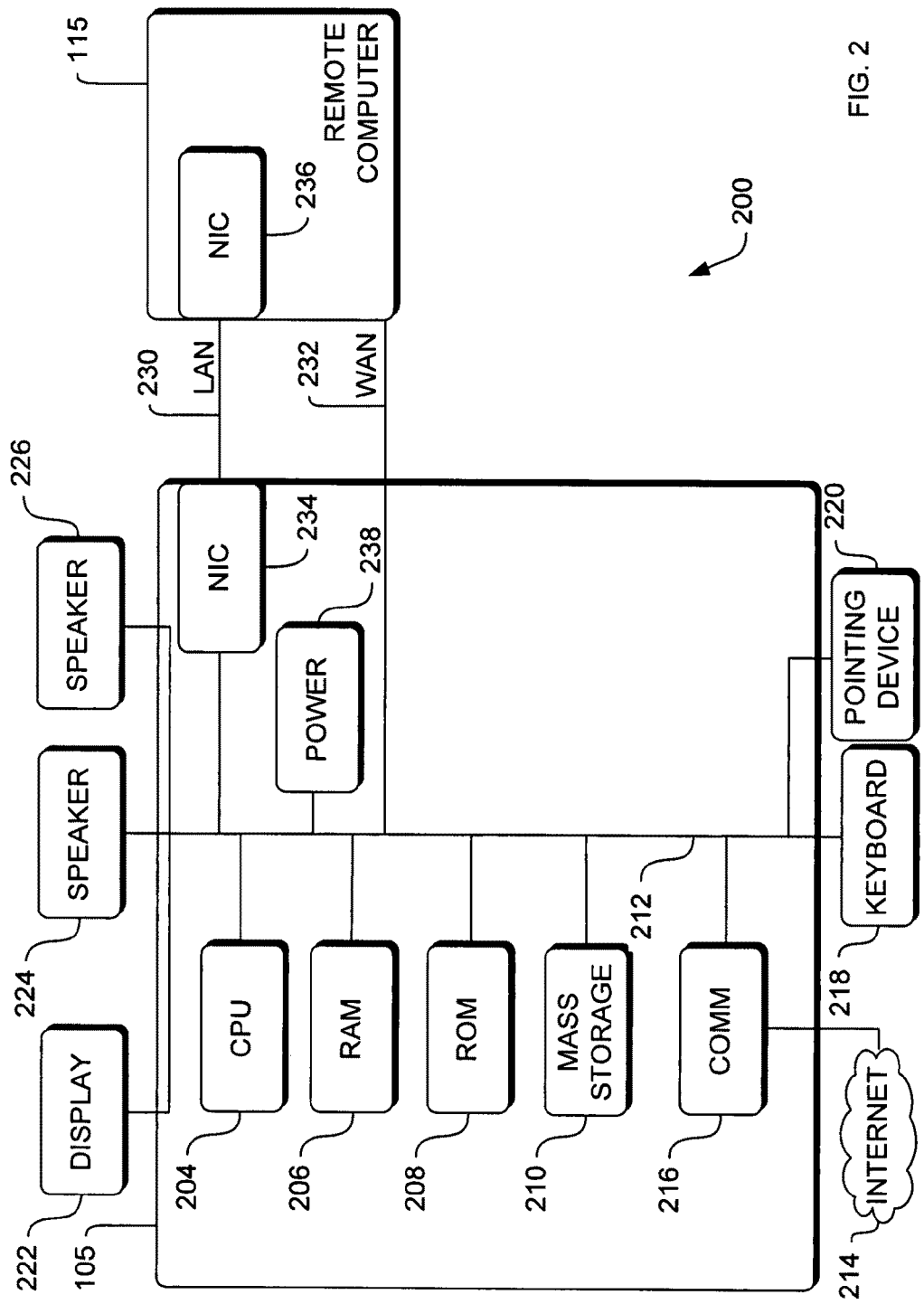
FIG. 2 is a block diagram of the hardware and operating environment in which different embodiments can be practiced.

FIG. 2 is a block diagram of the hardware and operating environment 200 in which different embodiments can be practiced. The description of FIG. 2 provides an overview of computer hardware and a suitable computing environment in conjunction with which some embodiments can be implemented. Embodiments are described in terms of a computer executing computer-executable instructions. However, some embodiments can be implemented entirely in computer hardware in which the computer-executable instructions are implemented in read-only memory. Some embodiments can also be implemented in client/server computing environments where remote devices that perform tasks are linked through a communications network. Program modules can be located in both local and remote memory storage devices in a distributed computing environment.

Computer 105 includes a processor 204, commercially available from Intel, Motorola, Cyrix and others. Computer 105 also includes random-access memory (RAM) 206, read-only memory (ROM) 208, and one or more mass storage devices 210, and a system bus 212, that operatively couples various system components to the processing unit 204. The memory 206, 208, and mass storage devices, 210, are types of computer-accessible media. Mass storage devices 210 are more specifically types of nonvolatile computer-accessible media and can include one or more hard disk drives, floppy disk drives, optical disk drives, and tape cartridge drives. The processor 204 executes computer programs stored on the computer-accessible media.

Computer 105 can be communicatively connected to the Internet 214 via a communication device 216. Internet 214 connectivity is well known within the art. In one embodiment, a communication device 216 is a modem that responds to communication drivers to connect to the Internet via what is known in the art as a "dial-up connection." In another embodiment, a communication device 216 is an Ethernet® or similar hardware network card connected to a local-area network (LAN) that itself is connected to the Internet via what is known in the art as a "direct connection" (e.g., T1 line, etc.).

A user enters commands and information into the computer 105 through input devices such as a keyboard 218 or a pointing device 220. The keyboard 218 permits entry of textual information into computer 202, as known within the art, and embodiments are not limited to any particular type of keyboard. Pointing device 220 permits the control of the screen pointer provided by a graphical user interface (GUI) of operating systems such as versions of Microsoft Windows®. Embodiments are not limited to any particular pointing device 220. Such pointing devices include mice, touch pads, trackballs, remote controls and point sticks. Other input devices (not shown) can include a microphone, joystick, game pad, satellite dish, scanner, or the like.

In some embodiments, computer 105 is operatively coupled to a display device 222. Display device 222 is connected to the system bus 212. Display device 222 permits the display of information, including computer, video and other information, for viewing by a user of the computer. Embodiments are not limited to any particular display device 222. Such display devices include cathode ray tube (CRT) displays (monitors), as well as flat panel displays such as liquid crystal displays (LCD's). In addition to a monitor, computers typically include other peripheral input/output devices such as printers (not shown). Speakers 224 and 226 provide audio output of signals. Speakers 224 and 226 are also connected to the system bus 212.

Computer 105 also includes an operating system (not shown) that is stored on the computer-accessible media RAM 206, ROM 208, and mass storage device 210, and is executed by the processor 204. Examples of operating systems include Microsoft Windows®, Apple MacOS®, Linux®, UNIX®. Examples are not limited to any particular operating system, however, and the construction and use of such operating systems are well known within the art.

Embodiments of computer 105 are not limited to any type of computer 105. In varying embodiments, computer 105 comprises a PC-compatible computer, a MacOS®-compatible computer, a Linux®-compatible computer, or a UNIX®-compatible computer. The construction and operation of such computers are well known within the art.

Computer 105 can be operated using at least one operating system to provide a graphical user interface (GUI) including a user-controllable pointer. Computer 202 can have at least one web browser application program executing within at least one operating system, to permit users of computer 105 to access intranet or Internet world-wide-web pages as addressed by Universal Resource Locator (URL) addresses. Examples of browser application programs include Netscape Navigator® and Microsoft Internet Explorer®.

The computer 105 can operate in a networked environment using logical connections to one or more remote computers, such as remote computer 115. These logical connections are achieved by a communication device coupled to, or a part of, the computer 202. Embodiments are not limited to a particular type of communications device. The remote computer 115 can be another computer, a server, a router, a network PC, a client, a peer device or other common network node. The logical connections depicted in FIG. 2 include a local-area network (LAN) 230 and a wide-area network (WAN) 232. Such networking environments are commonplace in offices, enterprise-wide computer networks, intranets and the Internet.

When used in a LAN-networking environment, the computer 105 and remote computer 115 are connected to the local network 230 through network interfaces or adapters 234, which is one type of communications device 216. Remote computer 115 also includes a network device 236. When used in a conventional WAN-networking environment, the computer 105 and remote computer 115 communicate with a WAN 232 through modems (not shown). The modem, which can be internal or external, is connected to the system bus 212. In a networked environment, program modules depicted relative to the computer 105, or portions thereof, can be stored in the remote computer 115. Computer 105 also includes power supply 238. Each power supply can be a battery.

Figure 3:
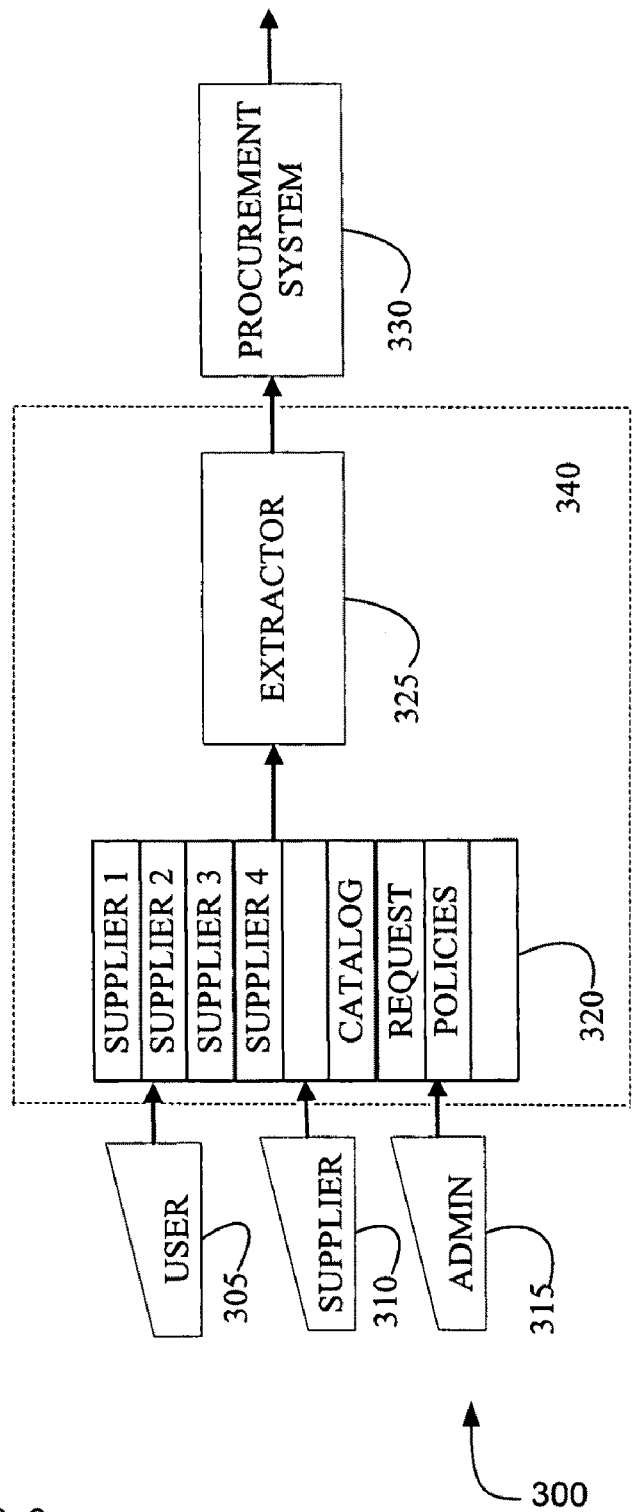
FIG. 3 is a diagram of an online purchasing system showing content management and procurement systems.

FIG. 3 is a block diagram that provides a system arrangement 300 for inputting, accessing, and interacting with purchasing information. This meets the need in the art for improved and quick resolution of line item approval and flagging of exceptional requests. Embodiments are described as operating in a multi-processing, multi-threaded operating environment on a computer, such as computer 105, 110, 115, 120, or 125 in FIG. 1.

System 300 includes an operator interface for user 305, supplier 310, and administrator 315. The operator interface supports the American National Standards Institute (ANSI) ASCII 12 and other communication interface standards. The operator interface further supports the use of tools for mapping, translation and conversion of any file format such as Electronic Data Interface (EDI) to a different file format. The distinction of user 305, supplier 310, and administrator 315 is for illustration purposes only because they are all users of the procurement order management and receipt system 100, but a distinction is necessary for the purpose of conveying the fact that each plays different roles and has access to a limited amount of information. The supplier 310 has access only to their information. For example, the supplier may enter information to their catalog reflecting prices and offerings, invoices, and information concerning a purchase order that they may be involved. The administrator 315 manages the approved supplier listing, access to suppliers, supplier catalog & rates and business purchasing policies. The user 305 for practical purposes is the buyer of products or services offered by the supplier 310. The user has access to information that is defined by the administrator. For example, a user may have access to particular purchase orders such as departmental, product groups, or the user was originator of the purchase order. The system allows for flexibility as to the access and roles that a supplier and purchaser may play.

System 320 is intended to show that multiple suppliers, catalogs, request, and purchasing policies can be supported by the online purchasing of outsourced services and products system.

System 325 is an extractor is used to extract requests entered by the user or the supplier. A request can be flagged as an exception request based on business purchasing policy such as total amount for the request, a purchase requiring special approval, a purchase allowed only for a select group of users. Additionally, extractor 325 can also be used to create a consolidated summary based on the information entered by the user or the supplier.

Figure 5:
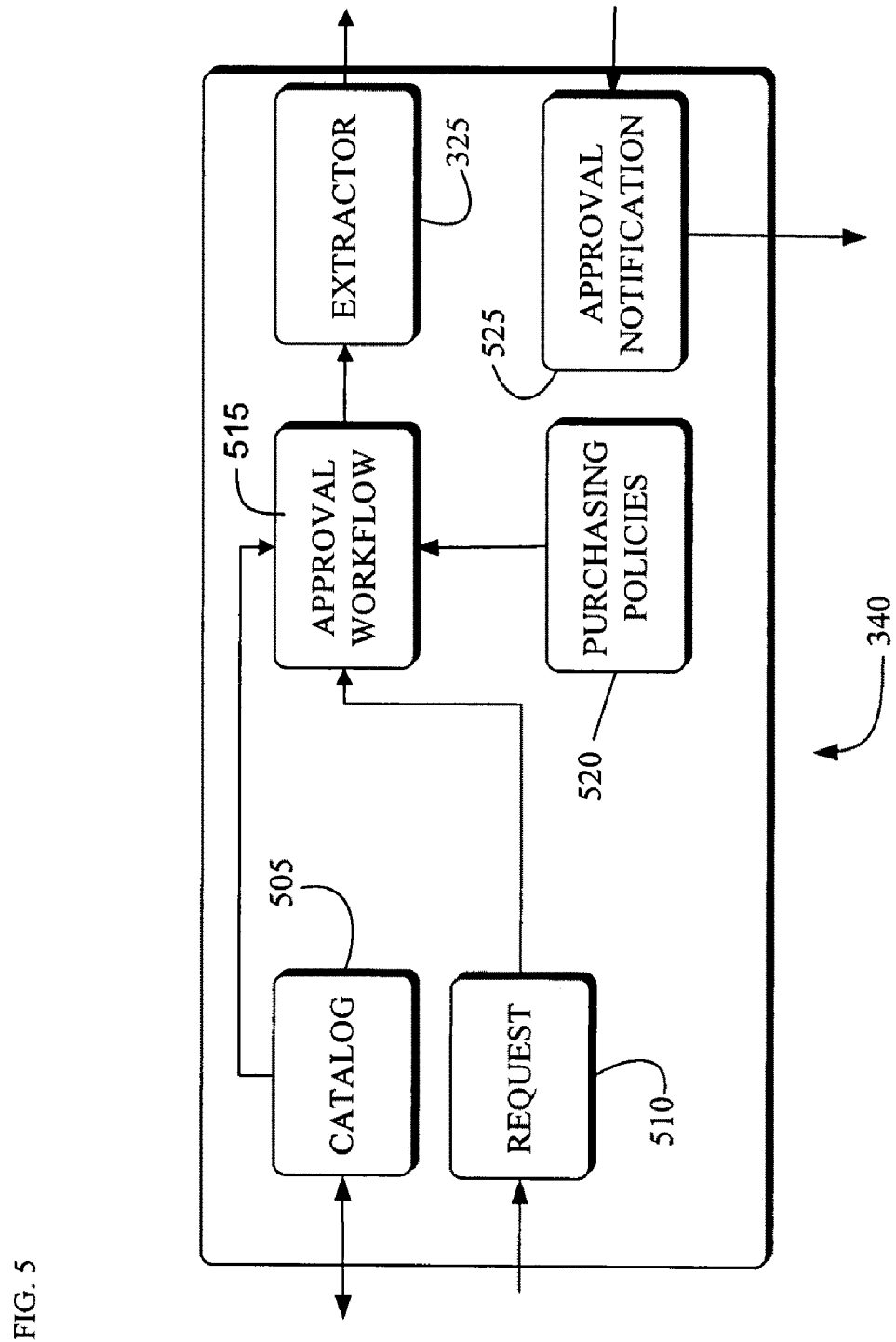
FIG. 5 is a diagram of a content management system illustrating an interaction between catalog, approval workflow, and purchasing policies.

System 340 is a combination of extractor 325 and system 320 which collectively is called the content management system as described in FIG. 5.

The procurement system 330 is used to manage all the purchasing activities like issuing purchasing orders and receivers, defining the approval workflow, product or service catalogs and pricing, supplier database, product category database, accounting logic and gatekeepers. A requisition, pre-Purchase order, is automatically generated with the line level details based on the data extracted by the extractor. The requisition is automatically routed for approval to the user who requested for the service or the item. The requisition then follows the approval workflow defined by the business. If the extractor 325 request is flagged as an exception request, the requisition is queued for an exception approval. After all the approvals, a purchase order is generated and sent to the supplier. The purchase order is exported into the accounts payable system and is flagged to pay upon receipt matching.

System 400 includes procurement system 330, splitter 405, and account payable system 415. For illustration purposes three account payable 410, 415, 420 systems are shown coupled to splitter 405, the splitter can accommodate one to many account payable systems.

Procurement system 330 can be any exiting legacy system or any present or future developed procurement system that can issue purchasing orders or receipt of purchasing orders, defines the approval workflow, product/service catalogs and pricing, supplier database, product category database, and accounting logic and gatekeepers. The procurement system 330 can be a program running on a general purpose computer or server, a form at a dedicated terminal that can be processed at the terminal or at an external site, or a series of audio command transmitted to a device for initiating the procurement process. Procurement involves issuing a purchase order to a Seller. The seller may be external or internal to the organization. The purchase order can be for a good, a service, or for an intangible or any interest that a price can be set by two or more parties. In some implementations, the buyer generates a receipt file to reflect a pending transaction initiated by the PO. In general, the PO file and receipt file include data fields representing some or all of the information contained in the PO. The data fields may include identification, assigned by the Buyer or Seller for referencing or tracking, such as purchase order, purchase order number, vendor number, vendor name, vendor remit address, total amount, line item quantity, line item amount, organization defined line items, discount percent, and/or discount days. Examples of purchase order fields are found in table 1 Purchase Order Fields which appears below.

The purchase order receipt in addition includes data such as invoice number, invoice date, and invoice total amount. Examples of receipt fields are found in tables label receipt header and receipt line item fields.

Splitter system 405 flags the purchase order and uses business specific logic based on unique company code, cost center accounts, or company code and cost code. The files are then placed in a digital repository based on business specific logic. Upon receiver or fulfillment of the purchase order a three way match is initiated to resolve the differences or order the accounting department to pay the invoice. These files can be downloaded or exported to the appropriate levels of the organization based on the business specific logic. Additionally, these files can then be data mined for the purpose of ascertaining purchasing patterns, fidelity to the purchasing guidelines and operational efficiencies.

Account payable 410, 415, 420 in general aspect is a host system in communication with one or more client systems. The host system may include a database or part of digital repository library 145 configured to receive an accounts payable file including at least one of invoice data, purchase order data, and vendor data; and verify a transaction by matching a dynamic data set of client-specified multi-dimensional records to attributes of the accounts payable file. The AP procedure in FIG. 9 further includes payment approval and generation after a three-way match is determined. In general, the Buyer will approve payment for conforming goods according to the payment terms found in the purchase agreement. The account payable procedure may also include information reporting generally relating to presenting data related to one or more transactions in a user-specified format. In general, reporting information may involve capturing data involved with a transaction, generating one or more data files based on the captured data, and outputting information regarding the one or more transactions to a user. In some cases, data may be routed to a printing system for reporting information in paper form. In other cases, the information may be reported in electronic form through a graphical user interface (GUI) that includes text, images, audio, video and/or other media for conveying information to a user. Reporting information in electronic form may involve utilizing the capabilities of Internet and/or wireless technologies. For example, information may be reported through an interactive Web page displayed by a browser application in response to data communicated over wired and/or wireless data pathways. Reporting information also may involve interpreting the data and suggesting financial strategies. For example, the Buyer may be presented with pricing strategies and/or marketing strategies for improving the flow of the Financial Supply Chain.

In the previous section, a system level overview of the operation of an embodiment was described. In this section, the particular methods performed by the server and the clients of such an embodiment are described by reference to a series of process flowcharts. Describing the methods by reference to a flowchart enables one skilled in the art to develop such programs, firmware, or hardware, including such instructions to carry out the methods on suitable computerized clients 105, 120, 125, or 110. The processor 204 of the clients 105, 120, 125, or 110 executing the instructions from computer-readable media. Similarly, the methods performed by the server 115 computer programs, firmware, or hardware are also composed of computer-executable instructions. Methods 340, 325, 330, 405, 410 and 1000 are performed by a client program executing on, or performed by firmware or hardware that is a part of, a computer, such as computer 105, 120, 125, or 110 in FIG. 1, and is inclusive of the acts required to be taken by the online purchasing system.

FIG. 5 is a flowchart of a method 340 performed by a client according to an embodiment. This meets the need in the art for improved and quick resolution of line item approval and flagging of exceptional requests. Further, this meets the need in the art for ensuring contract compliance and determination of purchasing patterns.

The method begins with the catalog 505 that make products available to user or buyers of the organization through procurement order management and receipt system 100, suppliers organize product information into catalogs. For example, a supplier may have an individual catalog of offerings or populate the offerings to a classification construct based on a well know classification scheme such as the United Nations Standard Product and Service Classifications ("UNSPSC"). An item category is the highest level at which an item or service can be categorized, such as office equipment, or industrial machinery. The product information structure in a catalog is a hierarchy of categories with items under these categories. The ways of representing this information can vary from supplier to supplier, even among suppliers of similar products. Catalog module 505 allows suppliers to map their existing catalogs to the online purchasing system 100 using a set of graphical interface tools. Catalog 505 allows for quick real-time catalog creation and maintenance by providing the creation of buyer managed content at the organization. Further, the supplier can specify line item details and other details that would then become part of the purchase order agreement. Thus, the supplier of the item or service can maintain a dynamic electronic catalog that represents accurate product and price information that can be tailored based on the organization's needs. Additionally, it possible at the catalog level for the organization through the administration to specify certain purchasing guidelines, define groups that have the authority to make purchases, and associate individuals that are required to approve the purchase order. Catalog 505 further enables a system administrator of the online purchasing system 100 to create and maintain a standardized structure that maps supplier catalog data to an online procurement and purchasing environment. Catalog 505 also provides the system administrator with the environment to create and manage catalogs of group-specific buyers and suppliers and generates requisitions and purchase products.

Request 510 is a requisition by a user with line level details of item or services needed to be fulfilled by a supplier. The request can also be an invoice by the supplier for a purchase order that has been fulfilled. Request 510 represents the user with a need for a product or service, who meets this need by querying the supplier 505 catalogs for the required items. The request 510 generates order requests and querying order status to the online purchasing system 100 using an Internet browser.

Approval workflow 515 combines information from the catalog 505, request 510, and purchasing policies 520 provide a framework for automatically processing line item approvals by identified approvers within an organization for line items in a purchasing requisition. The line item 175 of the request is analyzed to provide buyer or requisitioned the flexibility of having requisitions totally or partially approved by a group of identified approvers in the online purchasing process. When the individuals have been identified and those individuals have approved their individual portion of the line item, approval notification 525 provides users the ability to interactively track the requisitions approving process by scanning a series of computer screens and user in-boxes to identify those line items in a particular requisition that have been approved or declined.

Purchasing policies 520 are simple guidelines that every purchase order should follow. Purchasing policies 520 is configurable with generalized statements that allow for control of the flow and behavior of online purchasing system 100.

Extractor 325 functions to flag requests that are out of ordinary course of business. Requests that may require special approval, or requests which only certain individuals or groups are allowed to make.

Approval notification 525 is communication that the purchasing order has been approved internally and is ready to be sent to the supplier. The notification can be electronic mail, regular mail, audio communication, or a command to allocate funds from an account. In the case where an invoice has been presented it can a notification to the accounting department to begin payment on a demand for payment. Additionally, approval notification module 525 can generate an approval graph after a requisition has been submitted for line item approval showing whether or not an approver has acted on the request. A color-coding scheme allows the requester to track those line items in a particular requisition that the approver approves or declines. All modifications to the approval graph are communicated to the approval workflow module 515 by the administrator of the online purchasing system.

Figure 6:
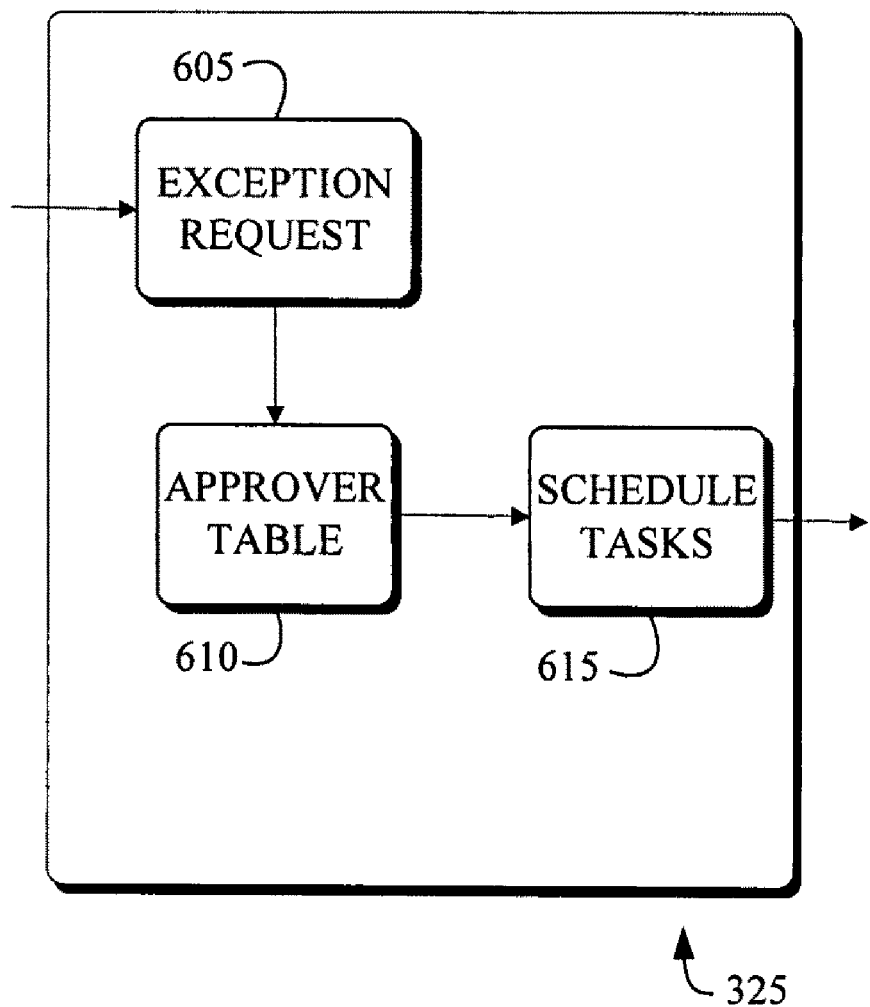
FIG. 6 is a diagram of an extractor system illustrating exception request, approver table, and scheduler.

FIG. 6 is a flowchart of the operations of the extractor module 325. This meets the need in the art for improved and quick resolution of line item approval and flagging of exceptional requests. Further, this meets the need in the art for ensuring contract compliance and determination of purchasing patterns.

Exception requests 605 analyses a request and using programmed logic determines if the request exceeds any acceptable parameters. For example, if an order exceeds a certain amount either monetarily or in quantity, if the item can only be purchased by certain individuals, if the period for payment is outside the customary period. Upon the occurrence of an exception, the module contains embedded logic to identify individuals that need to be added to the approver table in addition to the ones identified in approval workflow 515 module.

Approver table 610 is a table identifying all the individuals that defines the list of approvers based on a multi-segment number accounting codes that identify a business unit, division, department, or project to be billed for an order or specific line items on an order and commodity codes which identify a particular set of products or services. Each row of the table represents an approver, each column of the approver table 610 represents a single condition, such as maximum approval amount, commodity codes, or accounting codes.

Schedule tasks 615 sets up a process for having complete approval of a request. In the preferred embodiment module 615 when approvals have to be received before issuing a purchase order. It would then be possible to use this information to infer that the line item has not been approved by the individual. In the preferred embodiment, however, an absence of such a notification used to send an urgent communication that the approval or disapproval is needed as soon as possible.

Figure 7:
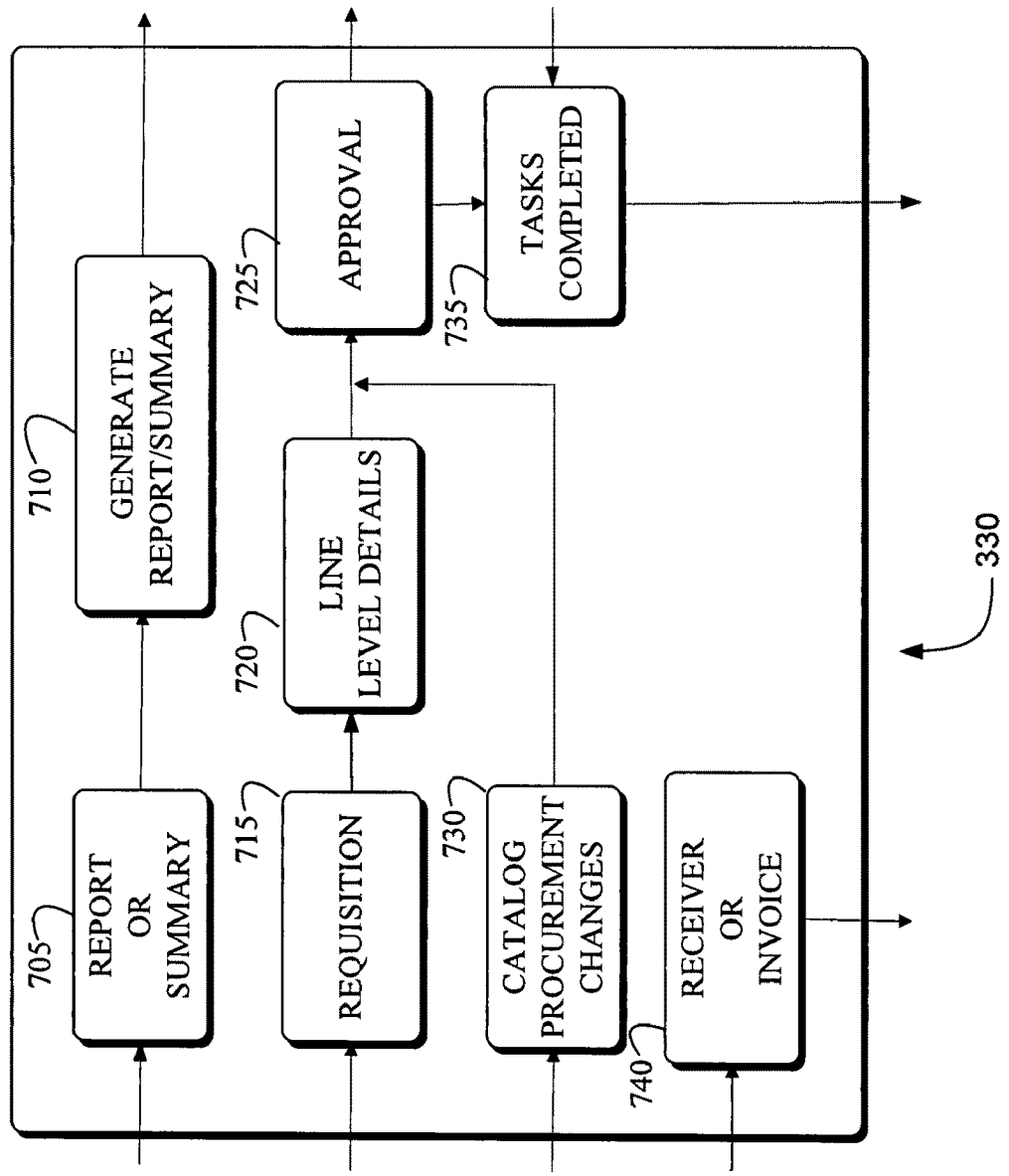
FIG. 7 is a diagram of the procurement system illustrating the interaction of line level details, approval, and tasks completed by the approvers.

FIG. 7 is a flowchart of the operations of the purchase order system 330. This meets the need in the art for improved and quick resolution of line item approval and flagging of exceptional requests. Further, this meets the need in the art for ensuring contract compliance and determination of purchasing patterns.

Report or summary 705 is for generating either a report of the purchasing activities of an organization, division, department, or cost code. The report can also be a summary of purchasing orders having the level of specificity desired by the user.

Generate report/summary 710 routes the request for the report or summary to the appropriate location and method of delivery. If the report or summary is a file it is possible to specify the format and file type that can easily be used with other tools for analysis of activities of an organization, department, or individuals.

Requisition 715 uses header information 165, shipment information 170, and distribution information 180 to assemble the initial part of the purchasing order.

Line level details 720 are then appended to the purchasing order. After the line level process is completed a purchase order has been assembled that is ready to be presented to the individuals that will then either approve or disapprove section of the line level details. The approvers can either receive the whole purchase order or they can receive only portions of the purchase order for which their approval is necessary.

Approval 725 notifies the individuals for approval and at the same time a copy is forwarded to the tasks completed module 735 that takes control of the purchase and does not relinquish control until all the approvals have been received.

Tasks completed 735 tracks each line item approver corresponding to each requisition to determine when the approver has acted on a given line item. As line items are approved or declined, module 755 tracks and notifies other approvers in the approval chain via approval notification module 525 regarding the status of a pending requisition. The tasks completed 735 module includes a timer that times the approval of a request by an approver.

Catalog procurement changes 730 is for the special occasions when the supplier wishes to change the offering, price, or line item details of products or services. In this situation the only approver is the administrator of the online purchasing system 100.

Receiver or invoice 740 is when a purchase order has been received by the organization. It should be noted that every purchase order has to have both an invoice and a receiver. This is necessary because a determination has been made that the order, the receiver, and the invoice are in conformance. If there is no agreement then those differences have to be resolved.

Figure 8:
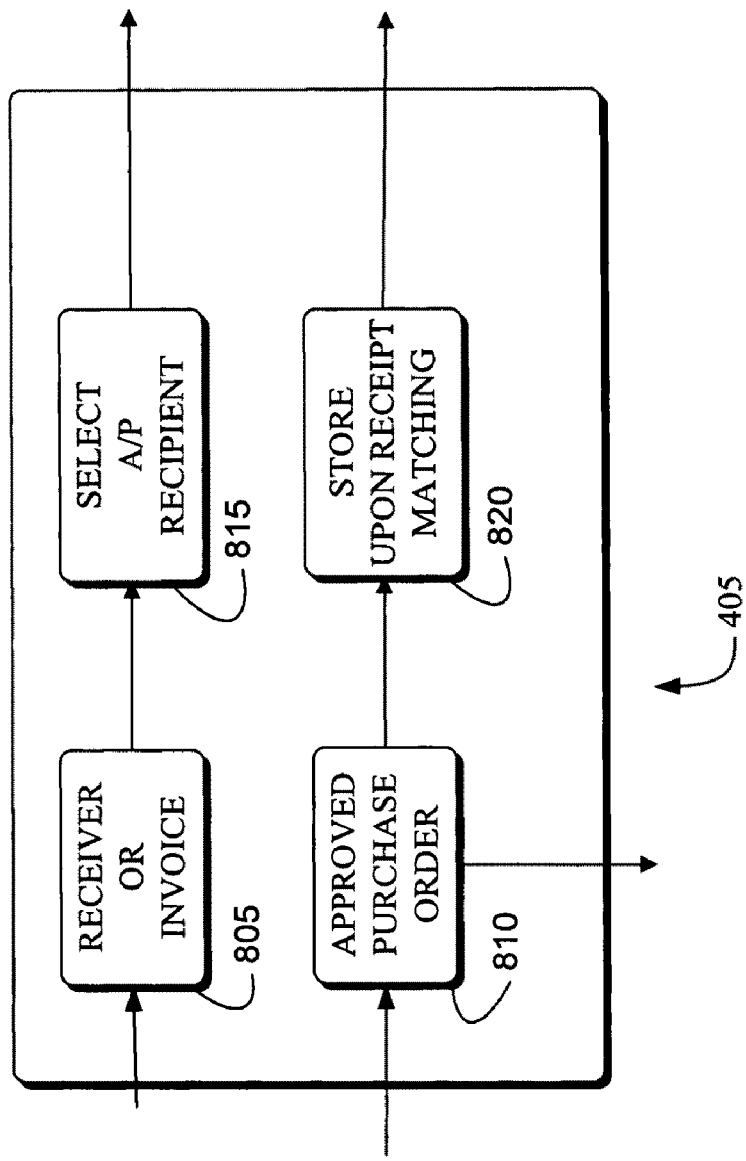
FIG. 8 is a diagram of the splitter illustrating the handling of receiver, invoice, and approved purchase order.

FIG. 8 shows the operation conducted by splitter 405. This meets the need in the art for improved and quick resolution of line item approval and flagging of exceptional requests. Further, this meets the need in the art for ensuring contract compliance and determination of purchasing patterns.

Receiver or invoice 805 routes the information to the correct account payable department. This determination can be made from business specific logic like division, location, company code, account center, or any other identification that can separate by using a unique code.

Select account payable recipient 815 exports the receiver file or the invoice file to the recipient account payable.

Approved purchase orders 810 are orders that have all the approvals and are ready to be fulfilled by the supplier. The orders are forwarded to a specialized section of the digital repository library 145 for receipt matching. The module 810, additionally, sends an indication to approval notification 525 for broadcasting to the originator of the requisition and to the supplier for fulfillment of the order.

Store upon receipt matching 820 stores a copy of a purchase order until a receipt is acknowledged. Upon receipt the copy of the purchase order is moved to another section of the digital repository library 145.

Figure 9:
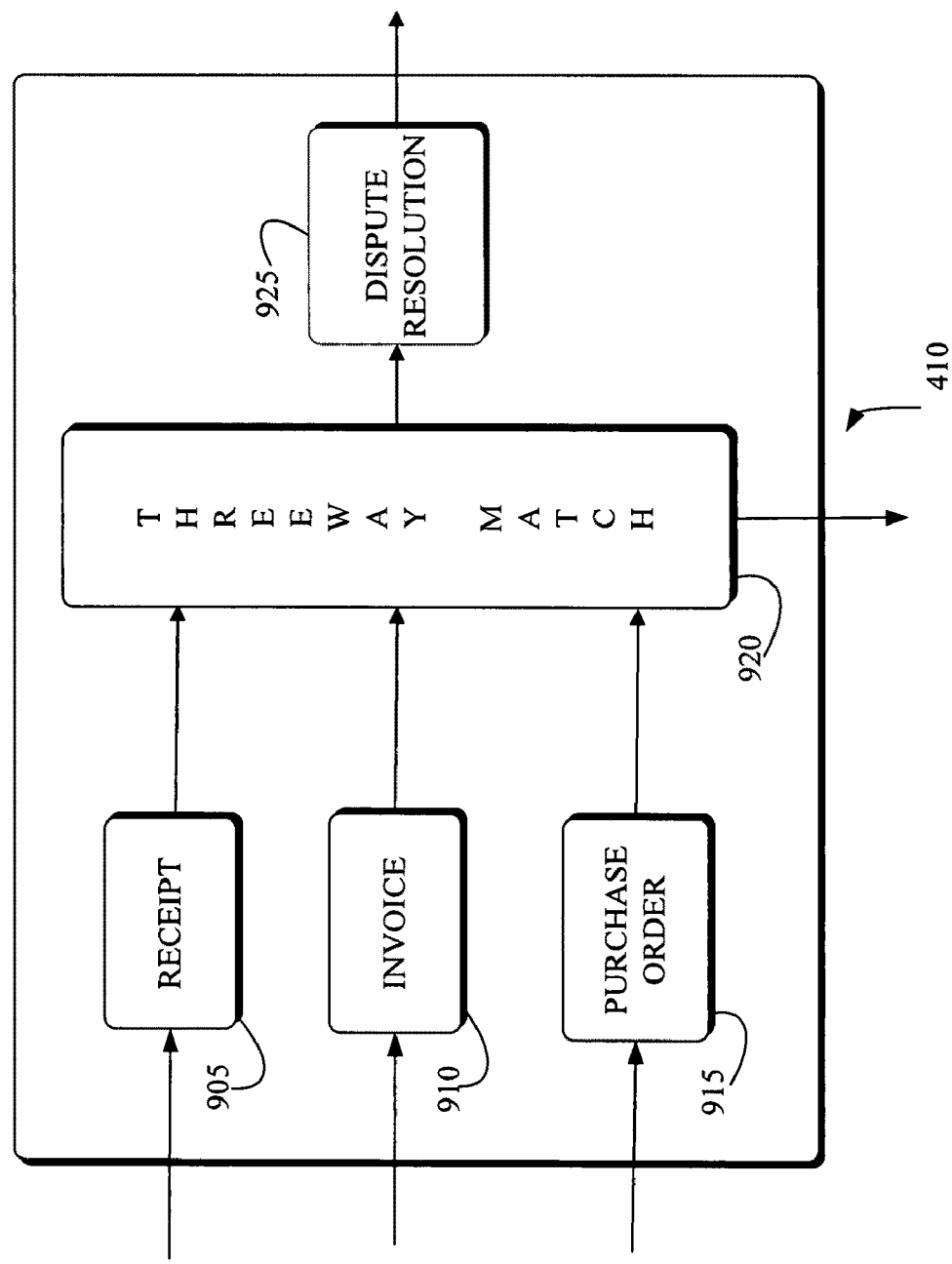
FIG. 9 is a diagram of the splitter illustrating the handling of receiver, invoice, approved purchase order, and three-way match.

FIG. 9 shows the operation of an account payable system 410. Receipt 905, Invoice 910, and Purchase Order 915 are input to a three-way matching module. The three-way match 920 compares the three files for consistency. If the three files are in agreement then a three-way match is established and the account payable department should proceed in the normal course of business. Further, one can establish a degree of relationship by simply calculating the number of selected fields between the files that are in agreement. If selected fields are in agreement then the degree of relationship is substantial. If an inconsistency is determined then a dispute resolution or an auditing should be initiated to abrogate the differences.

Figure 10:
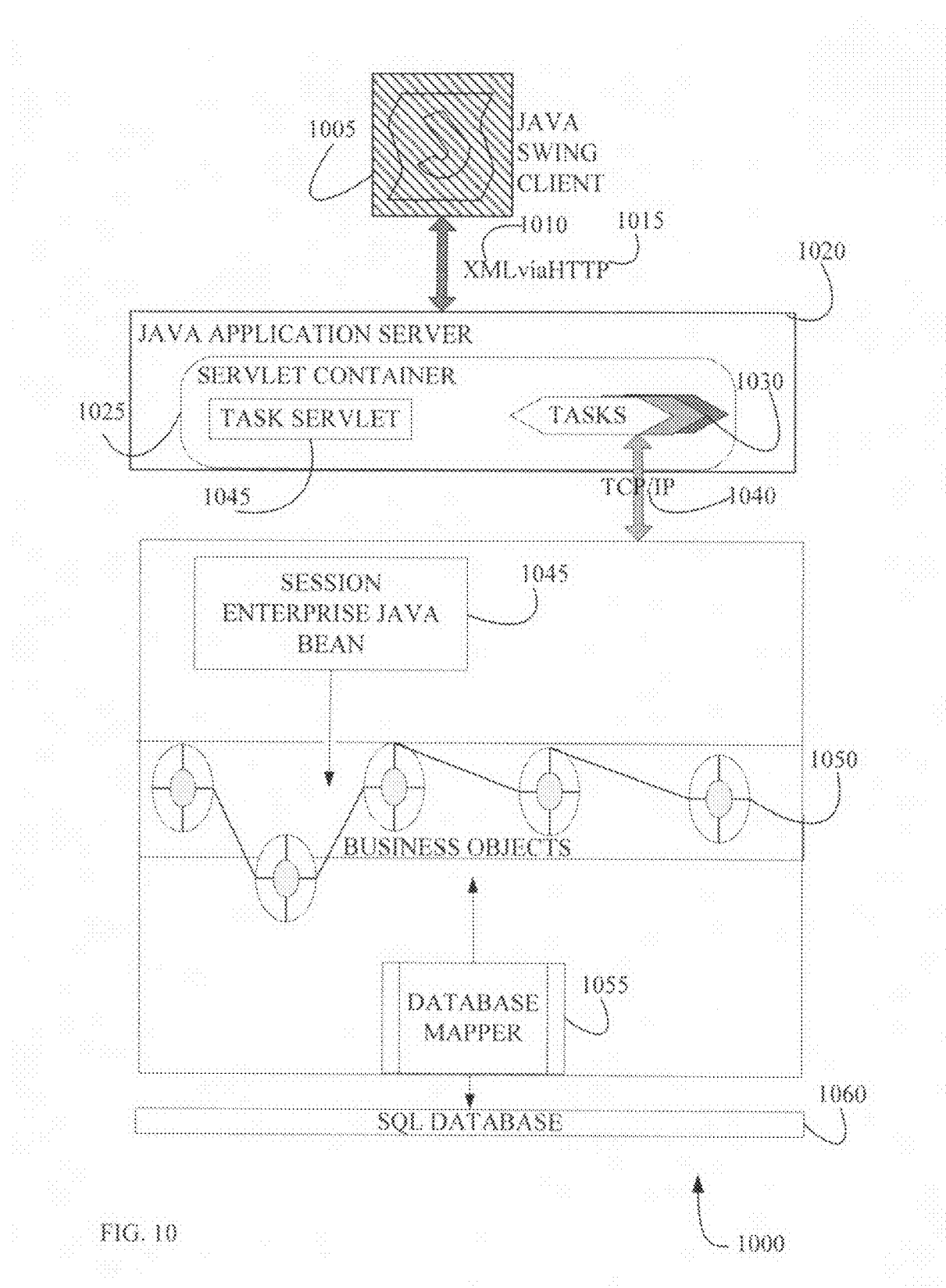
FIG. 10 is a java implementation of the online purchasing system.

FIG. 10 illustrates the various architectural layers that make up the computer system 105. The top layer represents the level at which a user directly interacts with the computer system 105 through field-delimited forms. In the preferred embodiment, the user accesses the computer system 105 through the Internet using a web browser at 1005, and thus the user connects to a java application server 1020 using an XML file 1010 and a protocol known as HTTP 1015. XML 1010 means eXtensible Markup Language, which is a condensed form of SGML (Standard Generalized Markup Language) a common format for web site design. XML 1010 supports customized tags to enhance organizational flexibility in presenting information. The HTTP 1015 protocol means Hypertext Transfer Protocol, a common method for communicating information between a web browser and a web server. When the online system is accessed from outside the network or gateway, a secure connection through HTTPS, a secured form of HTTP 1015, or some other security regime is used to protect all data from unauthorized access and manipulation. The java application server 1020 is responsible for facilitating a user's ability to access the computer system 105 through the filed delimited forms 1005. In the preferred embodiment, the computer system 105 is written in programming language known as Java. More specifically, a Java Two Enterprise standard is used. Such architecture will accommodate planned new components easily and is highly scalable. The architecture provides for flexible process flows, and utilizes a thin client application that is accessible via the Internet. Open interface architecture standards facilitate scalability to meet business growth. Java applications use a servlet 1025 to support particular applications. A servlet 1025 is a small Java program used to facilitate the performance of a software application on a server. In the preferred embodiment, a servlet 1025 will exist to support the software application running on the computer system at 205 with the application constituting a task 1030 to be supported.

The task 1030 in the java application server 1020 interfaces with an application layer 1065 using a protocol called TCP/IP 1040. TCP/IP 1040 means Transmission Control Protocol/Internet Protocol, a protocol suite for communication networks such as the Internet. Each "instance" of the software application running on the computer system at 105 will require an Enterprise Java Bean ("EJB") 1045. An EJB 1045 provides software developers with the ability to apply Java technology to the creation of reusable server components for business applications.

In the application layer 1065 contains the business logic of the computer system 105. For example, the process of validating certain line items 175 or shipment 170 is located in the domain layer. An object-oriented programming language such as Java is used to build the software that resides on the computer system 105. The application layer 1065 of an object-oriented software application will contain both a library of ancestor objects and application objects inheriting characteristics and functionality from the library of objects that collectively is called the business objects 1050.

The last section application layer 1065 in FIG. 10 is a database mapper 1055. The database mapper 1055 interfaces between the business objects 1050 where the business logic of a software application exists, and a data layer 1060 that houses the commercially available relational database at digital repository 145, such as SQL Server, Oracle, or Sybase, which actually stores purchase order agreement files, receipt files, and the other information created, inputted, and stored by the systems 105, 125, 135. The relational database in digital repository 145 is a relational database controlled by a database manager manufactured by Oracle Corp in Redwood City, Calif. Thus, a Persistent Object Service is implemented on top of a set of one or more relational databases controlled by a database manager, such as DB2 manufactured by IBM Corp. of Armonk, N.Y., Oracle manufactured by Oracle Corp. of Redwood City, Calif., Sybase manufactured by Sybase Corp. of Dublin, Calif., SQL Server manufactured by Microsoft Corp. of Redmond, Wash. and Informix manufactured by IBM Corp. The Persistent Object Service maps persistent objects to relational database tables and converts persistent object operations to a sequence of structured query language (SQL) statements. The online system advantageously maps each object to one or more relational database tables based on the object's attributes and its relationships with other objects. For inheritance object-to-table mapping, a top level table is created for base attributes, and child tables are created that contain only the extended attributes of inherited objects. In non-preferred embodiments, the database would not even need to be relational.

Figure 11:
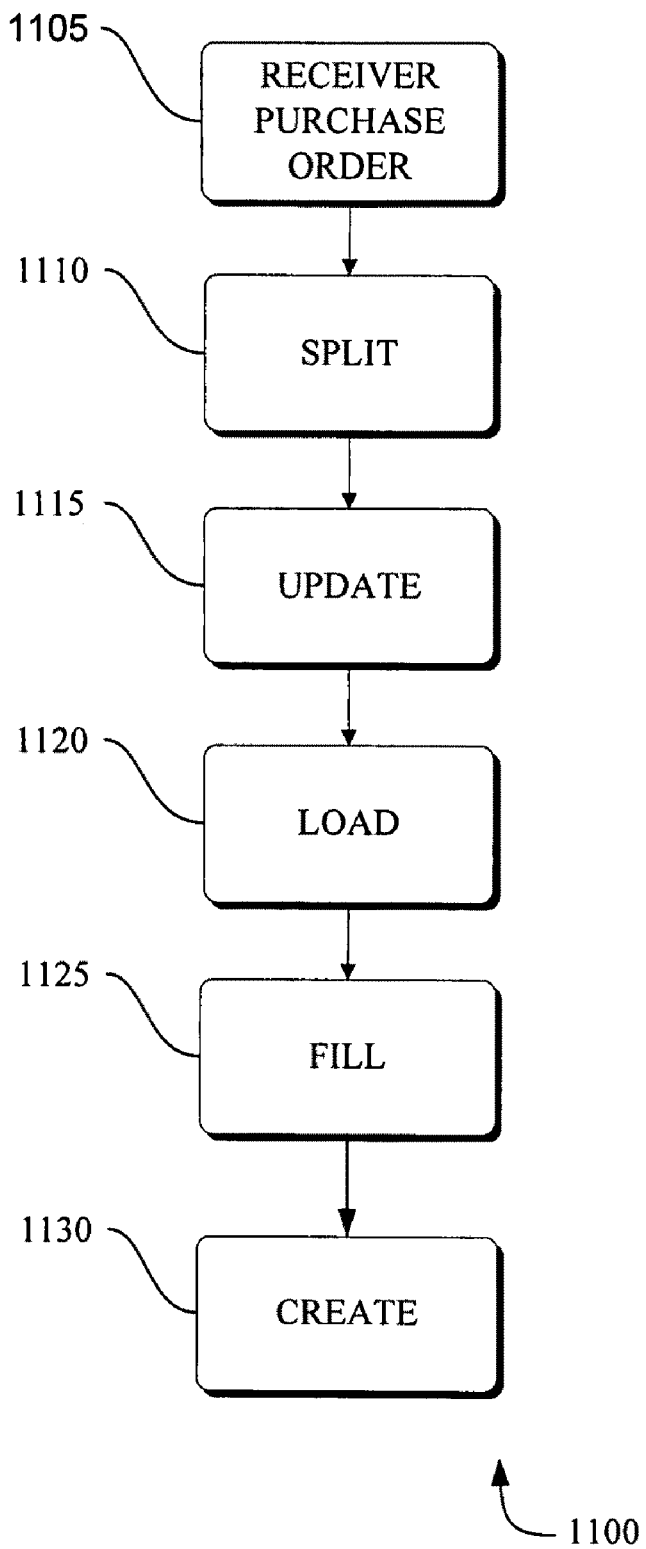
FIG. 11 is a flowchart of the operations of the splitter system.

FIG. 11 is a flowchart of a method 1100 that describes the operation of the splitter when importing data from a new or legacy procurement system in the organization. Method 1100 is described with reference to a purchase order, but it should be understood that same principle applies to a receiver file. Method 1100 solves the need in the art for improved and quick resolution of line item approval and flagging of exceptional requests. Furthermore, method 1100 solves the need in the art for ensuring contract compliance and determination of purchasing patterns.

The process begins with action 1105. At action 1105 a purchase order or receiver file is read or imported to the online purchasing system 100 through a terminal like computer 105. The origin of the data can be from a legacy mainframe system, a new procurement brought into the organization through acquisition and integration. In the present arrangement, the administrator or requester can pull the files from storage using the operator interface of the online purchasing system 100. After the file has accessed control passes to action 110. The process then continues with action 1110.

In action 1110, the accessed file is split. The purchase order is split into four purchase order files. The four record types are: purchase order header file, purchase order line item file, a purchase order shipment file, and a purchase order distribution file. In the case of a receiver file it is split into a receiver header file, and a receiver line item file.

In action 1115, the four purchase order files are then updated by changing the record numbers of each file. The record number of each file is changed to the organization code that was passed in as a parameter. If the organization has unique codes to separate purchase orders or receivers they can be used in place of the organization code. In the case of account payable the organization code will suffice. However a cost code, department code, product group code would work just as well.

In action 1120, the four purchase order files are loaded to an intermediate database using four different control (CTL) files. The result is that "header.ctl," "line.ctl," "shipment.ctl," and "distribution.ctl" files are created. The control files contain important information that is needed to operate the database. In addition to the above files there is customarily found control files with the name of all datafiles with prior database changes, the name of the database, the timestamp of when the database was created. When a database is mounted, its control file is used to find the datafiles and redo log files for that database. Because the control file is so important, it is imperative to back up the control file whenever a structural is made.

In action 1125, the process begins creating a cursor by tying all four tables together. The values from the tables are then used to fill a new table in the desired format of a genesis database. There will be term in the genesis database that may not exist in the legacy or integrated database. When this is the case then these values are mapped to the genesis values. This can be accomplished by the creation of a mapper table and using SELECT, FROM, WHERE, and AND commands to map the values. Additionally, when some fields do not exist or are not populated in the legacy system they are given default values.

In action 1130, the genesis purchase order file is created by writing all of the records that meet the desired match of organization code and a particular charge account. Other combinations are possible including the use of a single field as a basis for writing the file.

Actions 1105 through 1130 extract, transform, and load a purchase order to a desired database format. These three separate functions combined into a single programming tool. First, the extract function reads data from a specified source database and extracts a desired subset or all of the data. Secondly, the transform function works with the acquired data using rules or lookup tables or creating combinations with other data to convert it to the desired state. Finally, the load function is used to write the resulting data either all of the subset or just the changes to a genesis database.

Figure 4:
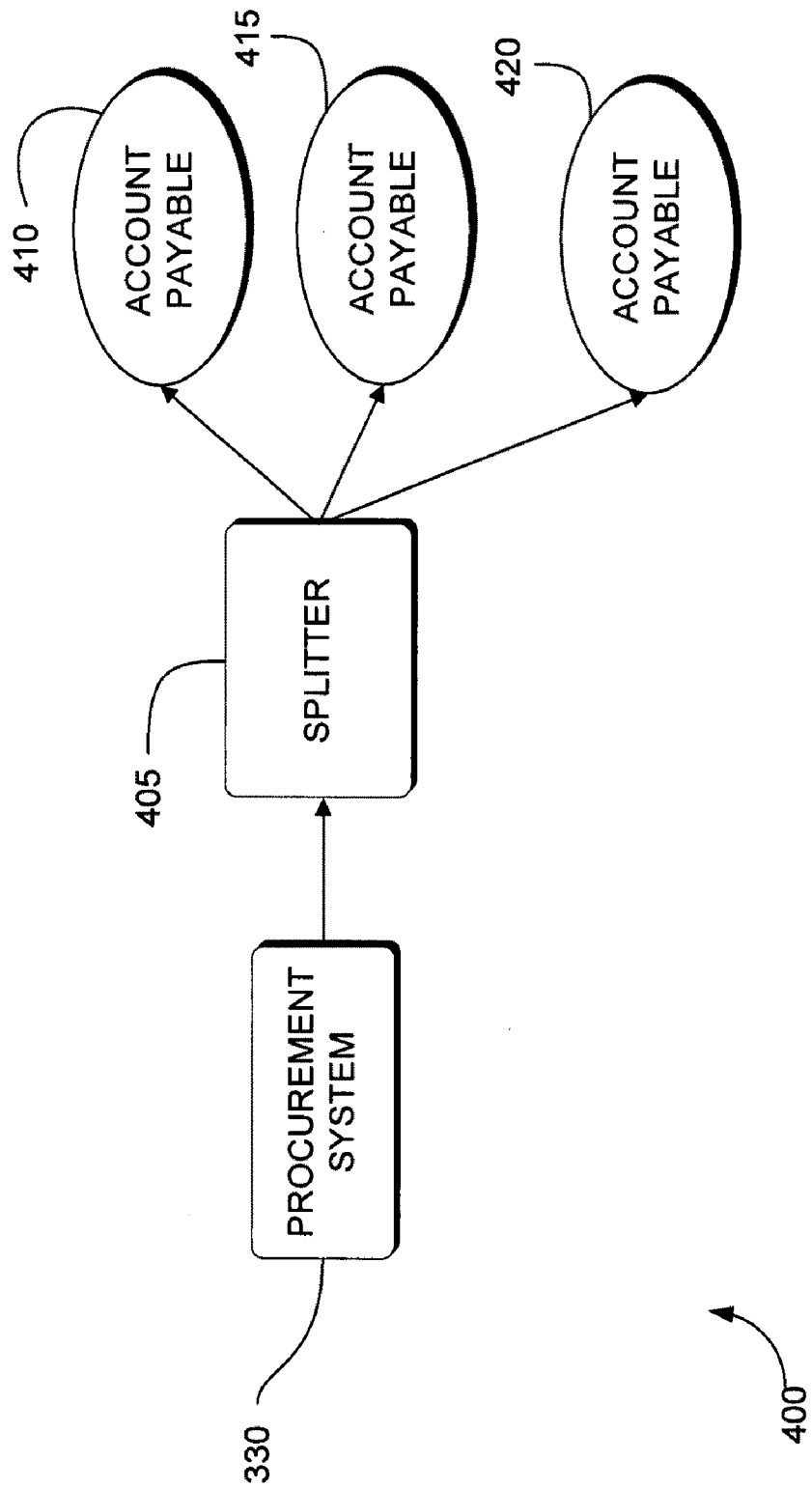
FIG. 4 is a diagram of an online purchasing system showing procurement system, splitter, and account payable.

Referring to FIGS. 5-9, particular implementations 340, 325, 330, 405, and 410 is described in conjunction with the system overview in FIGS. 3-4.

More specifically, in the computer-readable program embodiment, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer as in computer 105 in FIG. 2, or on at least as many computers as there are components.

The system 300 and 400 components of the online purchasing system 100 can be embodied as computer hardware circuitry or as a computer-readable program, or a combination of both. In another embodiment, systems 300 are 400 and implemented in an application service provider (ASP) system.

Table 1 below describes source field, definition and data type, with examples, for element in each records of a purchase order table:

TABLE 1

PURCHASE ORDER TABLE

| Column Name | Definition | Data Type | Example |
|---|---|---|---|
| ACCRUAL_ACCOUNT | | varchar2 | |
| AGENT_NAME | Buyer full name | varchar2 | Jane Doe |
| ALLOW_SUBSTITUTE_RECEIPTS_FLAG | | varchar2 | |
| AMOUNT_AGREED | | number | |
| AMOUNT_BILLED | | number | |
| AMOUNT_LIMIT | | number | |
| APPROVAL_REQUIRED_FLAG | | varchar2 | |
| APPROVAL_STATUS | | varchar2 | |
| APPROVED_DATE | | date | |
| ATTRIBUTE_CATEGORY | | varchar2 | |
| Up to 10 ATTRIBUTEs | | varchar2 | |
| BILL_TO_LOCATION | Bill to Location Code | varchar2 | Headquarters, Division, Department |
| CAPITAL_EXPENSE_FLAG | | varchar2 | |
| CATEGORY | | varchar2 | |
| CHARGE_ACCOUNT (9 segments) | | varchar2 | |
| COMMENTS | | varchar2 | |
| CONTRACT_NUM | | varchar2 | |
| CREATED_BY | | number | |
| CREATION_DATE | PO Creation Date (YYYYMMDD) | date | 20040321 |
| CURRENCY_CODE | Currency Code | varchar2 | USD, GBP |
| DAYS_EARLY_RECEIPT_ALLOWED | | number | |
| DAYS_LATE_RECEIPT_ALLOWED | | number | |
| DELIVER_TO_LOCATION | | varchar2 | |
| DESTINATION_ORGANIZATION | Destination Organization Code | varchar2 | |
| DESTINATION_SUBINVENTORY | | varchar2 | |
| DESTINATION_TYPE_CODE | | varchar2 | |
| DISTRIBUTION_NUM | Distribution Number | number | |
| DOCUMENT_SUBTYPE | | varchar2 | |
| DOCUMENT_TYPE_CODE | Document Type Code | varchar2 | STANDARD, BLANKET |
| EFFECTIVE_DATE | | date | |
| EMPLOYEE_NUMBER | MS number of the Employee or the 212 number generated in Oracle | varchar2 | MSxxxx nnnnnnnnn |
| ENFORCE_SHIP_TO_LOCATION_CODE | | varchar2 | |
| FOB | FOB | varchar2 | |
| FREIGHT_CARRIER | | varchar2 | |
| FREIGHT_TERMS | | varchar2 | |
| FROM_RFQ_NUM | | varchar2 | |
| FROM_TYPE_LOOKUP_CODE | | varchar2 | |
| GOVERNMENT_CONTEXT | | varchar2 | |
| GROUP_CODE | | varchar2 | |
| INSPECTION_REQUIRED_FLAG | | varchar2 | |
| INVOICE_CLOSE_TOLERANCE | | number | |
| ITEM | | varchar2 | |
| ITEM_DESCRIPTION | | varchar2 | |
| ITEM_REVISION | | varchar2 | |
| LINE_ATTRIBUTE_CATEGORY_LINES | | varchar2 | |
| LINE_ATTRIBUTE1 | UNSPSC Number | varchar2 | |
| LINE_NUM | Line Number in PO | number | |
| LINE_REFERENCE_NUM | | varchar2 | |
| LINE_TYPE | PO Line Type Code | varchar2 | Goods, Expense |
| LIST_PRICE_PER_UNIT | | number | |

TABLE 1-continued

PURCHASE ORDER TABLE

| Column Name | Definition | Data Type | Example |
|---|---|---|---|
| LOAD_SOURCING_RULES_FLAG | | varchar2 | |
| MARKET_PRICE | | number | |
| MIN_RELEASE_AMOUNT | | number | |
| NEED_BY_DATE | Need By Date (YYYYMMDD) | date | 20020321 |
| NOTE_TO_RECEIVER | | varchar2 | |
| NOTE_TO_VENDOR | | varchar2 | |
| PAY_ON_CODE | | varchar2 | |
| PAYMENT_TERMS | Payment Terms Name | varchar2 | 2% 10D, Net 30 |
| PROMISED_DATE | | date | |
| QTY_RCV_EXCEPTION_CODE | | varchar2 | |
| QTY_RCV_TOLERANCE | | number | |
| QUANTITY | Line Quantity | number | |
| QUANTITY_BILLED | | number | |
| QUANTITY_CANCELLED | | number | |
| QUANTITY_DELIVERED | | number | |
| QUANTITY_ORDERED | Ordered quantity | number | |
| RATE | | number | |
| RATE_DATE | | date | |
| RATE_TYPE | | varchar2 | |
| RATE_TYPE_CODE | | varchar2 | |
| RECEIPT_REQUIRED_FLAG | | varchar2 | |
| RECEIVE_CLOSE_TOLERANCE | | number | |
| RECEIVING_ROUTING | | varchar2 | |
| REFERENCE_NUM | PO Number | varchar2 | |
| RELEASE_DATE | | date | |
| RELEASE_NUM | | number | |
| REQ_HEADER_REFERENCE_NUM | | varchar2 | |
| REQ_LINE_REFERENCE_NUM | | varchar2 | |
| REVISED_DATE | | date | |
| REVISION_NUM | | number | |
| SHIP_TO_LOCATION | Ship To Location Code | varchar2 | City, State, or Country |
| SHIP_TO_ORGANIZATION_CODE | Valid Operating Unit Code | varchar2 | TSO, ACE |
| SHIPMENT_NUM | Should be unique for a particular supplier for the period of one year. | number | |
| SHIPMENT_TYPE | | varchar2 | |
| SOURCING_RULE_NAME | | varchar2 | |
| TAXABLE_FLAG | | varchar2 | |
| UNIT_PRICE | Unit Price | number | |
| UOM_CODE | Unit Of Measure Code | varchar2 | EA, MIN |
| VARIANCE_ACCOUNT | | varchar2 | |
| VENDOR_CONTACT | | varchar2 | |
| VENDOR_DOC_NUM | | varchar2 | |
| VENDOR_LIST | | varchar2 | |
| VENDOR_NAME | Vendor Name | varchar2 | Acme Company |
| VENDOR_NUM | Valid Vendor Number | varchar2 | |
| VENDOR_SITE_CODE | Vendor Site Code | varchar2 | City, State, or Country |
| DELIVER_TO_PERSON_FULL_NAME | | varchar2 | |
| UNIT_PRICE_FLAG | | varchar2 | |

Table 2 below describes column name and the maximum size for elements in each record of a receipt order header table:

TABLE 2

RECEIPT ORDER HEADER TABLE

| Column Name | Max Size | Comment |
| --- | --- | --- |
| GROUP_ID | Number | Should be a unique sequence number generated by the business. The sequence should be set up so that it does not repeat from initialization of the receipt process going forward. Will correspond to the same column in the Receipt Line file. |
| TRANSACTION_TYPE | 25 | Must be 'NEW' or 'CHANGE'. If 'NEW' then a new receipt will be created. If 'CHANGE', then an additional transaction will be added to an existing receipt. Transaction type for the line record must be 'CORRECT' or 'RETURN TO VENDOR'. |
| EDI_CONTROL_NUM | 10 | |
| LAST_UPDATE_DATE | Date | 'DD-MON-YYYY' |
| CREATION_DATE | Date | 'DD-MON-YYYY' |
| NOTICE_CREATION_DATE | Date | 'DD-MON-YYYY' |
| SHIPMENT_NUM | 30 | Should be unique for a particular supplier for the period of one year. |
| RECEIPT_NUM | 30 | Must be prefixed with business unit code. Number should be a generated by a sequence in the legacy system to ensure that unique constraint is not violated. For example, if the receipt number for GE Plastics America is 8, the receipt number passed to SSS would be GEPA-8. |
| VENDOR_NUM | 20 | Valid 9 digit GSL number |
| FROM_ORGANIZATION_CODE | 3 | Should be valid operating unit code, ex. Transportation = 'TSO', Aircraft = 'ACE ' |
| SHIP_TO_ORGANIZATION_CODE | 3 | Should be valid operating unit code |
| LOCATION_CODE | 20 | Should be valid location code |
| BILL_OF_LADING | 25 | |
| PACKING_SLIP | 25 | |
| SHIPPED_DATE | Date | Must be earlier or equal to expected receipt date and system date - 'DD-MON-YYYY' |
| FREIGHT_CARRIER_CODE | 25 | Should be a valid code |
| EXPECTED_RECEIPT_DATE | Date | The date must fall within the receipt date tolerance for the shipments with which receipt is being mapped - 'DD-MON-YYYY' |
| NUM_OF_CONTAINERS | Number | |
| WAYBILL_AIRBILL_NUM | 20 | |
| COMMENTS | 240 | |
| GROSS_WEIGHT | 22 | |
| GROSS_WEIGHT_UOM_CODE | 3 | |
| NET_WEIGHT | Number | |
| NET_WEIGHT_UOM_CODE | 3 | |
| TAR_WEIGHT | Number | |
| TAR_WEIGHT_UOM_CODE | 3 | |
| PACKAGING_CODE | 5 | |
| CARRIER_METHOD | 2 | |
| CARRIER_EQUIPMENT | 10 | |
| SPECIAL_HANDLING_CODE | 3 | |
| HAZARD_CODE | 1 | |

TABLE 2-continued

RECEIPT ORDER HEADER TABLE

| Column Name | Max Size | Comment |
| --- | --- | --- |
| HAZARD_CLASS | 4 | |
| HAZARD_DESCRIPTION | 80 | |
| FREIGHT_TERMS | 25 | |
| FREIGHT_BILL_NUMBER | 35 | |
| INVOICE_NUM | 30 | |
| INVOICE_DATE | Date | 'DD-MON-YYYY' |
| TOTAL_INVOICE_AMOUNT | Number | |
| TAX_NAME | 15 | |
| TAX_AMOUNT | Number | |
| FREIGHT_AMOUNT | Number | |
| CURRENCY_CODE | 15 | |
| CONVERSION_RATE_TYPE | 30 | |
| CONVERSION_RATE | Number | |
| CONVERSION_RATE_DATE | Date | 'DD-MON-YYYY' |
| PAYMENT_TERMS_NAME | 50 | |
| ATTRIBUTE_CATEGORY (up to 15) | 30 | |
| USGGL_TRANSACTION_CODE | 30 | |
| EMPLOYEE_NUMBER | 30 | Must be an employee number loaded into the Oracle HR system |
| INVOICE_STATUS_CODE | 25 | |
| LANGUAGE | 4 | Must be a valid language code. See Table A. |

Table 3 below describes columns names and maximum column size for elements in each record of a receipt line database table:

TABLE 3

RECEIPT ORDER LINE TABLE

| Column Name | Max Size | Comment |
| --- | --- | --- |
| LAST_UPDATE_DATE | Date | 'DD-MON-YYYY' |
| CREATION_DATE | Date | 'DD-MON-YYYY' |
| TRANSACTION_TYPE | 25 | Must be 'RECEIVE', 'CORRECT' or 'RETURN TO VENDOR'. If transaction type of header record is 'NEW', this value must be 'RECEIVE'. If transaction type of header record is 'CHANGE', this value must be 'CORRECT' or 'RETURN TO VENDOR' |
| TRANSACTION_DATE | Date | 'DD-MON-YYYY' |
| QUANTITY | Number | Must be a positive number |
| UNIT_OF_MEASURE | 25 | Unit of Measure for the Item (e.g. 'Each') |
| INTERFACE_SOURCE_LINE_ID | Number | Should be a unique sequence number generated by the business. The sequence should be set up so that it does not repeat from initialization of the receipt process going forward. |
| ITEM_DESCRIPTION | 240 | |
| ITEM_REVISION | 3 | |
| UOM_CODE | 3 | |
| PRIMARY_QUANTITY | Number | |
| PRIMARY_UNIT_OF_MEASURE | 25 | |
| FROM_SUBINVENTORY | 25 | |

TABLE 3-continued

RECEIPT ORDER LINE TABLE

| Column Name | Max Size | Comment |
| --- | --- | --- |
| PO_REVISION_NUM | Number | |
| PO_UNIT_PRICE | Number | |
| CURRENCY_CODE | 15 | |
| CURRENCY_CONVERSION_TYPE | 30 | |
| CURRENCY_CONVERSION_RATE | Number | |
| CURRENCY_CONVERSION_DATE | Date | 'DD-MON-YYYY' |
| SUBSTITUTE_UNORDERED_CODE | 25 | |
| RECEIPT_EXCEPTION_FLAG | 1 | |
| ACCRUAL_STATUS_CODE | 25 | |
| INSPECTION_STATUS_CODE | 25 | |
| INSPECTION_QUALITY_CODE | 25 | |
| DESTINATION_TYPE_CODE | 25 | |
| SUBINVENTORY | 10 | |
| DEPARTMENT_CODE | 10 | |
| WIP_OPERATION_SEQ_NUM | Number | |
| WIP_RESOURCE_SEQ_NUM | Number | |
| SHIPMENT_NUM | 30 | |
| FREIGHT_CARRIER_CODE | 25 | |
| BILL_OF_LADING | 25 | |
| PACKING_SLIP | 25 | |
| SHIPPED_DATE | Date | 'DD-MON-YYYY' |
| EXPECTED_RECEIPT_DATE | Date | Required if none provided by headers table. Must fall within expected receipt date tolerance for the shipments with which the receipt is being matched - 'DD-MON-YYYY' |
| ACTUAL_COST | Number | |
| TRANSFER_COST | Number | |
| TRANSPORTATION_COST | Number | |
| NUM_OF_CONTAINERS | Number | |
| WAYBILL_AIRBILL_NUM | 20 | |
| VENDOR_ITEM_NUM | 25 | |
| VENDOR_LOT_NUM | 30 | |
| RMA_REFERENCE | 30 | |
| COMMENTS | 240 | |
| ATTRIBUTE_CATEGORY | 30 | |
| EMPLOYEE_NUMBER | 30 | Must be an employee number loaded into the HR system database. Will be used to derive employee id and will be stored temporarily in attribute1. |
| ATTRIBUTE2 | 150 | |
| ATTRIBUTE3 | 150 | |
| ATTRIBUTE4 | 150 | |
| ATTRIBUTE5 | 150 | |
| ATTRIBUTE6 | 150 | |
| ATTRIBUTE7 | 150 | |
| ATTRIBUTE8 | 150 | |
| ATTRIBUTE9 | 150 | |
| ATTRIBUTE10 | 150 | |
| ATTRIBUTE11 | 150 | |
| ATTRIBUTE12 | 150 | |
| ATTRIBUTE13 | 150 | |
| ATTRIBUTE14 | 150 | |
| ATTRIBUTE15 | 150 | |
| SHIP_HEAD_ATTRIBUTE_CATEGORY Up to 15 Attributes. | 30 | |
| SHIP_LINE_ATTRIBUTE_CATEGORY Up to 15 Categories | 30 | |
| USSGL_TRANSACTION_CODE | 30 | |
| GOVERNMENT_CONTEXT | 30 | |
| DESTINATION_CONTEXT | 30 | |
| SOURCE_DOC_QUANTITY | Number | |
| SOURCE_DOC_UNIT_OF_MEASURE | 25 | |
| GROUP_ID | Number | Corresponds to the group ID from header record. Indicates the receipt lines that correspond to each receipt header |

TABLE 3-continued

RECEIPT ORDER LINE TABLE

| Column Name | Max Size | Comment |
| --- | --- | --- |
| VENDOR_CUM_SHIPPED_QTY | Number | |
| ITEM_NUM | 81 | |
| DOCUMENT_NUM | 30 | |
| DOCUMENT_LINE_NUM | Number | |
| TRUCK_NUM | 35 | |
| SHIP_TO_LOCATION_CODE | 35 | If not provided, will derive from the ship-to-organization-code from the header level. You can have different ship too at the transaction level if no value is provided at header level |
| CONTAINER_NUM | 35 | |
| SUBSTITUTE_ITEM_NUM | 81 | |
| NOTICE_UNIT_PRICE | Number | |
| ITEM_CATEGORY | 81 | This must be provided for one-time items that are not defined in inventory |
| LOCATION_CODE | 20 | |
| VENDOR_NUM | 30 | Should be valid 9 digit GSL number |
| FROM_ORGANIZATION_CODE | 3 | Should be valid operating unit code, ex. Transportation = 'TSO,' Aircraft = 'ACE'. Should match the value supplied at for the receipt header |
| TO_ORGANIZATION_CODE | 3 | Destination ship-to organization |
| INTRANSIT_OWNING_ORG_CODE | 3 | |
| ROUTING_CODE | 30 | |
| ROUTING_STEP | 30 | |
| RELEASE_NUM | Number | |
| DOCUMENT_SHIPMENT_LINE_NUM | Number | |
| DOCUMENT_DISTRIBUTION_NUM | Number | |
| DELIVER_TO_PERSON_NUM | 30 | Must be an employee number loaded into the Oracle HR system. Will be used to derive deliver to person id and will be stored temporarily in deliver to person name. |
| DELIVER_TO_LOCATION_CODE | 20 | |
| USE_MTL_LOT | Number | |
| USE_MTL_SERIAL | Number | |
| LOCATOR | 81 | |
| REASON_NAME | 30 | |
| QUANTITY_SHIPPED | Number | |
| QUANTITY_INVOICED | Number | |
| TAX_NAME | 15 | |
| TAX_AMOUNT | Number | |
| REQ_NUM | 25 | |
| REQ_LINE_NUM | Number | |
| REQ_DISTRIBUTION_NUM | Number | |
| WIP_ENTITY_NAME | 24 | |
| WIP_LINE_CODE | 10 | |
| RESOURCE_CODE | 30 | |
| SHIPMENT_LINE_STATUS_CODE | 25 | |
| BARCODE_LABEL | 35 | |
| TRANSFER_PERCENTAGE | Number | |
| COUNTRY_OF_ORGIN_CODE | 2 | |
| CUSTOMER_ITEM_NUM | 50 | |
| LANGUAGE | 4 | English, German, French, Japanese |

CONCLUSION

An online purchasing system has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations. For example, although described in object-oriented terms, one of ordinary skill in the art will appreciate that implementations can be made in a procedural design environment or any other design environment that provides the required relationships.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments. One of skill in the art will readily recognize that embodiments are applicable to future communication devices, different file systems, and new data types.

The terminology used in this application with respect to the modules is meant to include all object-oriented, database and communication environments and alternate technologies which provide the same functionality as described herein.

The invention claimed is:

1. A computer-accessible medium having executable instructions to communicate data from an online procurement system to an account payable system, the executable instructions directing a processor to perform:

extracting procurement data from a first database, the first database having a file format from an online procurement system;

splitting the extracted procurement data to a specified format in accordance with rules that define a plurality of procurement data fields in the specified format and a plurality of relationships between fields of an account payable data format wherein the splitting further comprises splitting the procurement data into four purchase order tables comprising a purchase order header table, purchase order line item table, a purchase order shipment table, and a purchase order distribution table;

changing a record number of each of the four purchase order tables to an organization code;

loading the four purchase order tables into an intermediate database using four control files, the four control files containing information to operate a second database;

filling a new table in a format of the second database from the values from the four purchase order tables;

mapping terms that do not exist in the first database to a genesis value;

creating a purchase order file by writing records that match the organization code and a particular charge account;

creating procurement data in an account payable format from the second database in the specified format; and communicating the created procurement data in the account payable format to an account payable system.

2. The computer-accessible medium of claim 1, wherein the executable instructions further comprise mounting the first database in reference to the control files.

3. The computer-accessible medium of claim 2, wherein the executable instructions further comprise backing up the control files.

4. The computer-accessible medium of claim 1, wherein the splitting further comprises:

updating a record number to a unique code that is indicative of a targeted account payable system.

5. The computer-accessible medium of claim 1, wherein the splitting further comprises:

loading control files of at least one of a header file, a line item file, a shipment file, and a distribution file.

6. The computer-accessible medium of claim 1, wherein creating procurement data further comprises:

mapping procurement data fields to account payable data fields.

7. The computer-accessible medium of claim 1, wherein creating procurement data further comprise:

assigning default values to account payable data fields that are not populated in extracted procurement data fields.

8. A computer-accessible medium having executable instructions, the executable instructions directing a processor to perform:

extracting procurement data having a file format from an online procurement system;

splitting the extracted procurement data to a specified format in accordance with rules that define a plurality of procurement data fields in the specified format and a plurality of relationships between fields of an account payable data format the splitting including splitting the procurement data into four purchase order tables comprising a purchase order header table, purchase order line item table, a purchase order shipment table, and a purchase order distribution table and the splitting further including loading the four purchase order tables into an intermediate database using four control files, the four control files containing information to operate a second database;

creating procurement data in an account payable format from the four purchase order tables in the intermediate database in the specified format;

communicating the created procurement data in the account payable format to an account payable system;

extracting from the created procurement data a first file with data that relates to a purchase order fulfilled by a supplier;

extracting from the created procurement data a second file from the supplier with data that relates to the purchase order fulfilled by a supplier;

extracting from the created procurement data a third file with data that relates to the purchase order before it was fulfilled by a supplier; and verifying from the first file, second file, and third file the degree of purchase order fulfillment by the supplier.

9. The computer-accessible medium of claim 8, wherein the executable instructions further comprise mounting the intermediate database in reference to the control files.

10. The computer-accessible medium of claim 8, wherein the executable instructions further comprises backing up the control files.

11. The computer-accessible medium of claim 8, wherein the splitting further comprises:

updating a record number to a unique code that is indicative of a targeted account payable system.

12. The computer-accessible medium of claim 8, wherein the control files further comprise:

a header file, a line item file, a shipment file, and a distribution file.

13. The computer-accessible medium of claim 8, wherein creating procurement data further comprises:

mapping procurement data fields to account payable data fields.

14. The computer-accessible medium of claim 8, wherein creating procurement data further comprises:

assigning default values to account payable data fields that are not populated in extracted procurement data fields.

15. The computer-accessible medium of claim 8, wherein the first file, second file, and third file have at least one or more fields that describe a relationship between the first, second, and third files.

16. The computer-accessible medium of claim 8, wherein creating procurement data further comprises:
    assigning default values to account payable data fields that are not populated in extracted procurement data fields; and
    wherein the first file, second file, and third file have at least one or more fields that describe a relationship between the first, second, and third files.

17. The computer-accessible medium of claim 8, wherein creating procurement data further comprises:
    assigning default values to account payable data fields that are not populated in extracted procurement data fields;
    wherein the first file, second file, and third file have at least one or more fields that describe a relationship between the first, second, and third files; and
    wherein the splitting further comprises:
    loading control files of at least one of a header file, a line item file, a shipment file, and a distribution file.

18. A computer-accessible medium having executable instructions to communicate data from an online procurement system to an account payable system, the executable instructions directing a processor to perform:
    splitting extracted procurement data to a specified format in accordance with rules that define a plurality of procurement data fields in the specified format and a plurality of relationships between fields of an account payable data format the splitting including splitting the procurement data into four purchase order tables comprising a purchase order header table, purchase order line item table, a purchase order shipment table, and a purchase order distribution table and the splitting further including loading the four purchase order tables into an intermediate database using four control files, the four control files containing information to operate a second database;
    receiving a first file with data that relates to a purchase order fulfilled by a supplier;
    receiving a second file from the supplier with data that relates to the purchase order fulfilled by a supplier;
    receiving a third file with data that relates to the purchase order before it was fulfilled by a supplier; and
    verifying from the first file, second file, and third file, the degree of purchase order fulfillment by a supplier in reference to the second database.

19. The computer-accessible medium of claim 18, wherein the first file, second file, and third file have at least one or more fields that describe a relationship between the first, second, and third files.

20. A computer-accessible medium having executable instructions to communicate data from an online procurement system to an account payable system, the executable instructions directing a processor to perform:
    extracting procurement data having a file format from an online procurement system;
    splitting the extracted procurement data to a specified format in accordance with rules that define a plurality of procurement data fields in the specified format and a plurality of relationships between fields of an account payable data format wherein the splitting includes transforming and loading a purchase order to a desired database format, wherein the transforming includes creating combinations with other data to convert the extracted procurement data to a desired state, and wherein the loading includes writing the transformed data to a database;
    creating procurement data in an account payable format from the database in the specified format; and
    communicating the created procurement data in the account payable format to an account payable system.

21. The computer accessible medium of claim 20, wherein the splitting further comprising splitting the procurement data into four purchase order tables comprising a purchase order header table, purchase order line item table, a purchase order shipment table, and a purchase order distribution table.

22. The computer accessible medium of claim 21, wherein the splitting results in at least one of a header file, a line item file, a shipment file, and a distribution file.

23. The computer accessible medium of claim 22, wherein the splitting further comprises:
    updating a record number to a unique code that is indicative of a targeted account payable system.

24. The computer accessible medium of claim 22, wherein the splitting further comprises:
    loading control files of at least one of a header file, a line item file, a shipment file, and a distribution file.

25. The computer accessible medium of claim 20, wherein creating procurement data further comprises:
    mapping procurement data fields to account payable data fields.

26. The computer accessible medium of claim 20, wherein creating procurement data further comprises:
    assigning default values to account payable data fields that are not populated in extracted procurement data fields.

27. A computer-accessible medium having executable instructions to communicate data from an online procurement system to an account payable system, the executable instructions directing a processor to perform:
    extracting procurement data having a file format from an online procurement system;
    responsive to the extracting, splitting the extracted procurement data to a specified format in accordance with rules that define a plurality of procurement data fields in the specified format and a plurality of relationships between fields of an account payable data format wherein the splitting further comprises
    splitting the procurement data into four purchase order tables comprising a purchase order header table, purchase order line item table, a purchase order shipment table, and a purchase order distribution table;
    changing a record number of each of the four purchase order tables to an organization code;
    loading the four purchase order tables into an intermediate database using four control files, the four control files containing information to operate a second database;
    filling a new table in a format of the second database from the values from the four purchase order tables;
    mapping terms that do not exist in the first database to a genesis value;
    creating a purchase order file by writing records that match the organization code and a particular charge account;
    responsive to the splitting, loading control files of at least one of a header file, a line item file, a shipment file, and a distribution file based on the intermediate database;
    responsive to the splitting, responsive to the splitting, creating procurement data in an account payable format from the loaded control files; and responsive to the creating, communicating the created procurement data in the account payable format to an account payable system.

28. The computer accessible medium of claim 27, wherein the splitting is
updating a record number to a unique code that is indicative of a targeted account payable system.

29. The computer accessible medium of claim 27, wherein the method further comprises backing up the control files.

30. A computer-accessible medium having executable instructions, the executable instructions directing a processor to perform:
extracting procurement data having a file format from an online procurement system;
splitting the extracted procurement data to a specified format in accordance with rules that define a plurality of procurement data fields in the specified format and a plurality of relationships between fields of an account payable data format wherein the splitting further comprises
splitting the procurement data into four purchase order tables comprising a purchase order header table, purchase order line item table, a purchase order shipment table, and a purchase order distribution table;
loading the four purchase order tables into an intermediate database using four control files, the four control files containing information to operate a second database;
mapping terms that do not exist in the first database to a genesis value;
creating a purchase order file by writing records that match an organization code and a particular charge account;
creating procurement data in an account payable format from the second database in the specified format; and
communicating the created procurement data in the account payable format to an account payable system.

31. The computer-accessible medium of claim 30, wherein the executable instructions further comprise mounting the first database in reference to the control files include the names of all data files with prior database changes, the name of each database, and the timestamp of when each database was created.

32. The computer-accessible medium of claim 31, wherein the splitter is further operable to back up the control files.

33. The computer-accessible medium of claim 31, wherein the splitting further comprises:
updating a record number to a unique code that is indicative of a targeted account payable system.

34. The computer-accessible medium of claim 31, wherein the splitting further comprises:
loading control files of at least one of a header file, a line item file, a shipment file, and a distribution file.

35. The computer-accessible medium of claim 31, wherein creating procurement data further comprises mapping procurement data fields to account payable data fields.

36. The computer-accessible medium of claim 31, wherein creating procurement data further comprises assigning default values to account payable data fields that are not populated in extracted procurement data fields.

37. A computer-accessible medium having executable instructions to produce account payable data, the executable instructions directing a processor to perform:
extracting procurement data having a file format from an online procurement system;
splitting the extracted procurement data to a specified format in accordance with rules that define a plurality of procurement data fields in the specified format and a plurality of relationships between fields of an account payable data format wherein the splitting includes transforming and loading a purchase order to a desired database format, wherein the transforming includes creating combinations with other data to convert the extracted procurement data to a desired state, and wherein the loading includes writing the transformed data to a database;
creating procurement data in an account payable format from the database in the specified format;
wherein the extracted procurement data is one of purchase order data or receiver data; and
wherein the splitting results in at least one of a header file, a line item file, a shipment file, and a distribution file.

38. The computer-accessible medium of claim 37, wherein the splitting further comprises:
updating a record number to a unique code that is indicative of a targeted account payable system; and
wherein creating procurement data further comprises:
assigning default values to account payable data fields that are not populated in extracted procurement data fields.

39. A system to transact in electronic commerce comprising:
a processor;
a storage device coupled to the processor;
software apparatus operative on the processor for communicating data from the storage device to an account payable system coupled to the processor:
extracting procurement data wherein the extracted procurement data is one of purchase order data or receiver data having a file format from the storage device coupled to the processor;
splitting the extracted procurement data to a specified format in accordance with rules that define a plurality of procurement data fields in the specified format and a plurality of relationships between fields of an account payable data format wherein the splitting further comprises
splitting the procurement data into four purchase order tables comprising a purchase order header table, purchase order line item table, a purchase order shipment table, and a purchase order distribution table;
changing a record number of each of the four purchase order tables to an organization code;
loading the four purchase order tables into an intermediate database using four control files, the four control files containing information to operate a second database;
filling a new table in a format of the second database from the values from the four purchase order tables;
creating a purchase order file by writing records that match the organization code and a particular charge account;
creating procurement data in an account payable format from the database in the specified format; and
communicating the created procurement data in the account payable format to an account payable system.

40. The system of claim 39, wherein the splitting results in at least one of a header file, a line item file, a shipment file, and a distribution file; and
wherein creating procurement data further comprises:
assigning default values to account payable data fields that are not populated in extracted procurement data fields.

41. An apparatus for purchase order verification comprising:
- a splitter of procurement data to a specified format in accordance with rules that define a plurality of procurement data fields in the specified format and a plurality of relationships between fields of an account payable data format the splitter operable to split the procurement data into four purchase order tables, the four purchase order tables comprising a purchase order header table, purchase order line item table, a purchase order shipment table, and a purchase order distribution table and the splitter operable to load the four purchase order tables into an intermediate database using four control files, the four control files containing information to operate a second database;
- a device for receiving a first file with data that relates to a purchase order fulfilled by a supplier;
- a device for receiving a second file from the supplier with data that relates to the purchase order fulfilled by a supplier;
- a device for receiving a third file with data that relates to the purchase order before it was fulfilled by a supplier; and
- a device for verifying from the first file, second file, and third file the degree of purchase order fulfillment by a supplier from the intermediate database.

42. The apparatus of claim 41, wherein the first file, second file, and third file have at least one or more fields that describe relationships between the first, second, and third files.

43. A system to transact in electronic commerce comprising:
- a processor;
- a storage device coupled to the processor; and
- software apparatus operative on the processor for purchase order verification comprising:
- splitting the extracted procurement data to a specified format in accordance with rules that define a plurality of procurement data fields in the specified format and a plurality of relationships between fields of an account payable data format the splitting including splitting the procurement data into four purchase order tables comprising a purchase order header table, purchase order line item table, a purchase order shipment table, and a purchase order distribution table and the splitting further including loading the four purchase order tables into an intermediate database using four control files, the four control files containing information to operate a second database;
- receiving a first file with data that relates to a purchase order fulfilled by a supplier;
- receiving a second file from the supplier with data that relates to the purchase order fulfilled by a supplier;
- receiving a third file with data that relates to the purchase order before it was fulfilled by a supplier; and
- verifying from the first file, second file, and third file the degree of purchase order fulfillment by a supplier from the intermediate database.

* * * * *